(12) United States Patent
Wagner et al.

(10) Patent No.: US 10,387,177 B2
(45) Date of Patent: *Aug. 20, 2019

(54) STATEFUL VIRTUAL COMPUTE SYSTEM

(71) Applicant: Amazon Technologies, Inc., Seattle, WA (US)

(72) Inventors: Timothy Allen Wagner, Seattle, WA (US); Sean Philip Reque, Everett, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 28 days.

This patent is subject to a terminal disclaimer.

(21) Appl. No.: 15/450,795

(22) Filed: Mar. 6, 2017

(65) Prior Publication Data

US 2017/0177391 A1 Jun. 22, 2017

Related U.S. Application Data

(63) Continuation of application No. 14/614,141, filed on Feb. 4, 2015, now Pat. No. 9,588,790.

(51) Int. Cl.
*G06F 9/48* (2006.01)
*G06F 11/36* (2006.01)
(Continued)

(52) U.S. Cl.
CPC ...... *G06F 9/45533* (2013.01); *G06F 9/45558* (2013.01); *G06F 9/4881* (2013.01);
(Continued)

(58) Field of Classification Search
CPC .. G06F 7/78; G06F 8/00–78; G06F 9/44–455; G06F 11/36; G06F 9/45533;
(Continued)

(56) References Cited

U.S. PATENT DOCUMENTS

| 4,949,254 A | 8/1990 | Shorter |
| 5,283,888 A | 2/1994 | Dao et al. |

(Continued)

FOREIGN PATENT DOCUMENTS

| EP | 2663052 A1 | 11/2013 |
| JP | 2002287974 A | 10/2002 |

(Continued)

OTHER PUBLICATIONS

Stack Overflow, Creating a database connection pool, 2009 (Year: 2009).*

(Continued)

*Primary Examiner* — Qing Chen
(74) *Attorney, Agent, or Firm* — Knobbe Martens Olson & Bear LLP

(57) ABSTRACT

A system for providing a stateful virtual compute system is provided. The system may be configured to maintain a plurality of virtual machine instances. The system may be further configured to receive a request to execute a program code and select a virtual machine instance to execute the program code on the selected virtual machine instance. The system may further associate the selected virtual machine instance with shared resources and allow program codes executed in the selected virtual machine instance to access the shared resources.

20 Claims, 5 Drawing Sheets

(51) Int. Cl.
*G06F 9/455* (2018.01)
*H04L 29/08* (2006.01)

(52) U.S. Cl.
CPC .......... *G06F 11/3668* (2013.01); *H04L 67/10* (2013.01); *G06F 2009/4557* (2013.01); *G06F 2009/45562* (2013.01); *G06F 2009/45575* (2013.01); *G06F 2009/45591* (2013.01)

(58) Field of Classification Search
CPC ............... G06F 9/45558; G06F 9/4881; G06F 11/3668; G06F 2009/45562; G06F 2009/4557; G06F 2009/45575; G06F 2009/45591; H04L 67/10
USPC .......................................................... 718/1
See application file for complete search history.

(56) References Cited

U.S. PATENT DOCUMENTS

| | | |
|---|---|---|
| 5,970,488 A | 10/1999 | Crowe et al. |
| 6,385,636 B1 | 5/2002 | Suzuki |
| 6,463,509 B1 | 10/2002 | Teoman et al. |
| 6,708,276 B1 | 3/2004 | Yarsa et al. |
| 7,036,121 B1 | 4/2006 | Casabona et al. |
| 7,590,806 B2 | 9/2009 | Harris et al. |
| 7,665,090 B1 | 2/2010 | Tormasov et al. |
| 7,707,579 B2 | 4/2010 | Rodriguez |
| 7,730,464 B2 | 6/2010 | Trowbridge |
| 7,774,191 B2 | 8/2010 | Berkowitz et al. |
| 7,823,186 B2 | 10/2010 | Pouliot |
| 7,886,021 B2 | 2/2011 | Scheifler et al. |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,051,180 B2 | 11/2011 | Mazzaferri et al. |
| 8,051,266 B2 | 11/2011 | DeVal et al. |
| 8,065,676 B1 | 11/2011 | Sahai et al. |
| 8,065,682 B2 | 11/2011 | Baryshnikov et al. |
| 8,095,931 B1 | 1/2012 | Chen et al. |
| 8,127,284 B2 | 2/2012 | Meijer et al. |
| 8,146,073 B2 | 3/2012 | Sinha |
| 8,166,304 B2 | 4/2012 | Murase et al. |
| 8,171,473 B2 | 5/2012 | Lavin |
| 8,209,695 B1 | 6/2012 | Pruyne et al. |
| 8,219,987 B1 | 7/2012 | Vlaovic et al. |
| 8,321,554 B2 | 11/2012 | Dickinson |
| 8,321,558 B1 | 11/2012 | Sirota et al. |
| 8,336,079 B2 | 12/2012 | Budko et al. |
| 8,429,282 B1 | 4/2013 | Ahuja |
| 8,448,165 B1 | 5/2013 | Conover |
| 8,490,088 B2 | 7/2013 | Tang |
| 8,555,281 B1 | 10/2013 | Van Dijk et al. |
| 8,566,835 B2 | 10/2013 | Wang et al. |
| 8,613,070 B1 | 12/2013 | Borzycki et al. |
| 8,631,130 B2 | 1/2014 | Jackson |
| 8,677,359 B1 | 3/2014 | Cavage et al. |
| 8,694,996 B2 | 4/2014 | Cawlfield et al. |
| 8,719,415 B1 | 5/2014 | Sirota et al. |
| 8,725,702 B1 | 5/2014 | Raman et al. |
| 8,756,696 B1 | 6/2014 | Miller |
| 8,769,519 B2 | 7/2014 | Leitman et al. |
| 8,799,236 B1 | 8/2014 | Azari et al. |
| 8,799,879 B2 | 8/2014 | Wright et al. |
| 8,806,468 B2 | 8/2014 | Meijer et al. |
| 8,819,679 B2 | 8/2014 | Agarwal et al. |
| 8,825,863 B2 | 9/2014 | Hansson et al. |
| 8,825,964 B1 | 9/2014 | Sopka et al. |
| 8,850,432 B2 | 9/2014 | Mcgrath et al. |
| 8,874,952 B2 | 10/2014 | Tameshige et al. |
| 8,904,008 B2 | 12/2014 | Calder et al. |
| 8,997,093 B2 | 3/2015 | Dimitrov |
| 9,027,087 B2 | 5/2015 | Ishaya et al. |
| 9,038,068 B2 | 5/2015 | Engle et al. |
| 9,052,935 B1 | 6/2015 | Rajaa |
| 9,086,897 B2 | 6/2015 | Oh et al. |
| 9,092,837 B2 | 7/2015 | Bala et al. |
| 9,098,528 B2 | 8/2015 | Wang |
| 9,110,732 B1 | 8/2015 | Forschmiedt et al. |
| 9,111,037 B1 | 8/2015 | Nalis et al. |
| 9,112,813 B2 | 8/2015 | Jackson |
| 9,141,410 B2 | 9/2015 | Leafe et al. |
| 9,146,764 B1 | 9/2015 | Wagner |
| 9,152,406 B2 | 10/2015 | De et al. |
| 9,164,754 B1 | 10/2015 | Pohlack |
| 9,183,019 B2 | 11/2015 | Kruglick |
| 9,208,007 B2 | 12/2015 | Harper et al. |
| 9,218,190 B2 | 12/2015 | Anand et al. |
| 9,223,561 B2 | 12/2015 | Orveillon et al. |
| 9,223,966 B1 | 12/2015 | Satish et al. |
| 9,250,893 B2 | 2/2016 | Blahaerath et al. |
| 9,268,586 B2 | 2/2016 | Voccio et al. |
| 9,298,633 B1 | 3/2016 | Zhao et al. |
| 9,317,689 B2 | 4/2016 | Aissi |
| 9,323,556 B2 | 4/2016 | Wagner |
| 9,361,145 B1 | 6/2016 | Wilson et al. |
| 9,413,626 B2 | 8/2016 | Reque et al. |
| 9,436,555 B2 | 9/2016 | Dornemann et al. |
| 9,461,996 B2 | 10/2016 | Hayton et al. |
| 9,471,775 B1 | 10/2016 | Wagner et al. |
| 9,483,335 B1 | 11/2016 | Wagner et al. |
| 9,489,227 B2 | 11/2016 | Oh et al. |
| 9,537,788 B2 | 1/2017 | Reque et al. |
| 9,575,798 B2 | 2/2017 | Terayama et al. |
| 9,588,790 B1 | 3/2017 | Wagner et al. |
| 9,600,312 B2 | 3/2017 | Wagner et al. |
| 9,652,306 B1 | 5/2017 | Wagner et al. |
| 9,652,617 B1 | 5/2017 | Evans et al. |
| 9,654,508 B2 | 5/2017 | Barton et al. |
| 9,661,011 B1 | 5/2017 | Van Horenbeeck et al. |
| 9,678,773 B1 | 6/2017 | Wagner et al. |
| 9,678,778 B1 | 6/2017 | Youseff |
| 9,715,402 B2 | 7/2017 | Wagner et al. |
| 9,727,725 B2 | 8/2017 | Wagner et al. |
| 9,733,967 B2 | 8/2017 | Wagner et al. |
| 9,760,387 B2 | 9/2017 | Wagner et al. |
| 9,767,271 B2 | 9/2017 | Ghose |
| 9,785,476 B2 | 10/2017 | Wagner et al. |
| 9,811,363 B1 | 11/2017 | Wagner |
| 9,811,434 B1 | 11/2017 | Wagner |
| 9,830,175 B1 | 11/2017 | Wagner |
| 9,830,193 B1 | 11/2017 | Wagner et al. |
| 9,830,449 B1 | 11/2017 | Wagner |
| 9,910,713 B2 | 3/2018 | Wisniewski et al. |
| 9,921,864 B2 | 3/2018 | Singaravelu et al. |
| 9,928,108 B1 | 3/2018 | Wagner et al. |
| 9,929,916 B1 * | 3/2018 | Subramanian ........ G06F 3/0484 |
| 9,930,103 B2 | 3/2018 | Thompson |
| 9,952,896 B2 | 4/2018 | Wagner et al. |
| 9,977,691 B2 | 5/2018 | Marriner et al. |
| 10,002,026 B1 | 6/2018 | Wagner |
| 10,013,267 B1 | 7/2018 | Wagner et al. |
| 10,042,660 B2 | 8/2018 | Wagner et al. |
| 10,048,974 B1 | 8/2018 | Wagner et al. |
| 10,061,613 B1 | 8/2018 | Brooker et al. |
| 10,067,801 B1 | 9/2018 | Wagner |
| 10,102,040 B2 | 10/2018 | Marriner et al. |
| 10,108,443 B2 | 10/2018 | Wagner et al. |
| 10,140,137 B2 | 11/2018 | Wagner |
| 10,162,672 B2 | 12/2018 | Wagner et al. |
| 10,162,688 B2 | 12/2018 | Wagner |
| 10,203,990 B2 | 2/2019 | Wagner et al. |
| 2002/0172273 A1 | 11/2002 | Baker et al. |
| 2003/0071842 A1 | 4/2003 | King et al. |
| 2003/0084434 A1 | 5/2003 | Ren |
| 2003/0229794 A1 | 12/2003 | James, II et al. |
| 2004/0003087 A1 | 1/2004 | Chambliss et al. |
| 2004/0098154 A1 | 5/2004 | McCarthy |
| 2004/0249947 A1 | 12/2004 | Novaes et al. |
| 2004/0268358 A1 | 12/2004 | Darling et al. |
| 2005/0044301 A1 | 2/2005 | Vasilevsky et al. |
| 2005/0120160 A1 | 6/2005 | Plouffe et al. |
| 2005/0132167 A1 | 6/2005 | Longobardi |
| 2005/0132368 A1 | 6/2005 | Sexton et al. |

(56) References Cited

U.S. PATENT DOCUMENTS

| | | |
|---|---|---|
| 2005/0193113 A1 | 9/2005 | Kokusho et al. |
| 2005/0193283 A1 | 9/2005 | Reinhardt et al. |
| 2005/0257051 A1 | 11/2005 | Richard |
| 2006/0123066 A1 | 6/2006 | Jacobs et al. |
| 2006/0129684 A1 | 6/2006 | Datta |
| 2006/0184669 A1 | 8/2006 | Vaidyanathan et al. |
| 2006/0200668 A1 | 9/2006 | Hybre et al. |
| 2006/0212332 A1 | 9/2006 | Jackson |
| 2006/0242647 A1 | 10/2006 | Kimbrel et al. |
| 2006/0248195 A1 | 11/2006 | Toumura et al. |
| 2007/0094396 A1 | 4/2007 | Takano et al. |
| 2007/0130341 A1 | 6/2007 | Ma |
| 2007/0199000 A1 | 8/2007 | Shekhel et al. |
| 2007/0220009 A1* | 9/2007 | Morris ............... G06F 21/6218 |
| 2007/0255604 A1 | 11/2007 | Seelig |
| 2008/0028409 A1 | 1/2008 | Cherkasova et al. |
| 2008/0052725 A1 | 2/2008 | Stoodley et al. |
| 2008/0082977 A1 | 4/2008 | Araujo et al. |
| 2008/0104247 A1 | 5/2008 | Venkatakrlshnan et al. |
| 2008/0104608 A1 | 5/2008 | Hyser et al. |
| 2008/0126110 A1 | 5/2008 | Haeberle et al. |
| 2008/0126486 A1 | 5/2008 | Heist |
| 2008/0127125 A1* | 5/2008 | Anckaert ............... G06F 21/53 717/136 |
| 2008/0147893 A1 | 6/2008 | Marripudi et al. |
| 2008/0189468 A1 | 8/2008 | Schmidt et al. |
| 2008/0201711 A1 | 8/2008 | Husain |
| 2008/0209423 A1 | 8/2008 | Hirai |
| 2009/0013153 A1 | 1/2009 | Hilton |
| 2009/0025009 A1 | 1/2009 | Brunswig et al. |
| 2009/0055810 A1 | 2/2009 | Kondur |
| 2009/0055829 A1 | 2/2009 | Gibson |
| 2009/0070355 A1 | 3/2009 | Cadarette et al. |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0193410 A1 | 7/2009 | Arthursson et al. |
| 2009/0198769 A1 | 8/2009 | Keller et al. |
| 2009/0204960 A1* | 8/2009 | Ben-Yehuda ......... G06F 9/45558 718/1 |
| 2009/0204964 A1 | 8/2009 | Foley et al. |
| 2009/0222922 A1* | 9/2009 | Sidiroglou ............. H04L 51/12 726/23 |
| 2009/0288084 A1 | 11/2009 | Astete et al. |
| 2009/0300599 A1 | 12/2009 | Piotrowski |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0036925 A1 | 2/2010 | Haffner |
| 2010/0064299 A1 | 3/2010 | Kacin et al. |
| 2010/0070678 A1 | 3/2010 | Zhang et al. |
| 2010/0070725 A1 | 3/2010 | Prahlad et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131936 A1 | 5/2010 | Cheriton |
| 2010/0131959 A1 | 5/2010 | Spiers et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0269109 A1 | 10/2010 | Cartales |
| 2010/0325727 A1 | 12/2010 | Neystadt et al. |
| 2011/0010722 A1 | 1/2011 | Matsuyama |
| 2011/0029970 A1 | 2/2011 | Arasaratnam |
| 2011/0055378 A1 | 3/2011 | Ferris et al. |
| 2011/0055396 A1 | 3/2011 | DeHaan |
| 2011/0078679 A1 | 3/2011 | Bozek et al. |
| 2011/0099204 A1 | 4/2011 | Thaler |
| 2011/0099551 A1 | 4/2011 | Fahrig et al. |
| 2011/0131572 A1 | 6/2011 | Elyashev et al. |
| 2011/0134761 A1 | 6/2011 | Smith |
| 2011/0141124 A1 | 6/2011 | Halls et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0179162 A1 | 7/2011 | Mayo et al. |
| 2011/0184993 A1 | 7/2011 | Chawla et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |
| 2011/0265164 A1 | 10/2011 | Lucovsky |
| 2011/0271276 A1 | 11/2011 | Ashok et al. |
| 2011/0314465 A1 | 12/2011 | Smith et al. |
| 2011/0321033 A1 | 12/2011 | Kelkar et al. |
| 2012/0011496 A1 | 1/2012 | Shimamura |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0072762 A1 | 3/2012 | Atchison et al. |
| 2012/0072914 A1 | 3/2012 | Ota |
| 2012/0079004 A1 | 3/2012 | Herman |
| 2012/0096271 A1 | 4/2012 | Ramarathinam et al. |
| 2012/0096468 A1 | 4/2012 | Chakravorty et al. |
| 2012/0102307 A1 | 4/2012 | Wong |
| 2012/0102333 A1 | 4/2012 | Wong |
| 2012/0110155 A1 | 5/2012 | Adlung et al. |
| 2012/0110164 A1 | 5/2012 | Frey et al. |
| 2012/0110570 A1* | 5/2012 | Jacobson ............ G06F 9/45533 718/1 |
| 2012/0110588 A1 | 5/2012 | Bieswanger et al. |
| 2012/0131379 A1 | 5/2012 | Tameshige et al. |
| 2012/0192184 A1 | 7/2012 | Burckart et al. |
| 2012/0197958 A1 | 8/2012 | Nightingale et al. |
| 2012/0233464 A1 | 9/2012 | Miller et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0067494 A1 | 3/2013 | Srour et al. |
| 2013/0080641 A1 | 3/2013 | Lui et al. |
| 2013/0097601 A1 | 4/2013 | Podvratnik et al. |
| 2013/0111469 A1 | 5/2013 | B et al. |
| 2013/0132942 A1 | 5/2013 | Wang |
| 2013/0139152 A1 | 5/2013 | Chang et al. |
| 2013/0139166 A1 | 5/2013 | Zhang et al. |
| 2013/0151648 A1 | 6/2013 | Luna |
| 2013/0152047 A1 | 6/2013 | Moorthi et al. |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0185719 A1 | 7/2013 | Kar et al. |
| 2013/0185729 A1 | 7/2013 | Vasic et al. |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0198748 A1* | 8/2013 | Sharp ................. G06F 3/0605 718/1 |
| 2013/0198763 A1* | 8/2013 | Kunze ................. G06F 9/542 719/318 |
| 2013/0205092 A1 | 8/2013 | Roy et al. |
| 2013/0219390 A1 | 8/2013 | Lee et al. |
| 2013/0227097 A1 | 8/2013 | Yasuda et al. |
| 2013/0227534 A1 | 8/2013 | Ike et al. |
| 2013/0227563 A1 | 8/2013 | McGrath |
| 2013/0227641 A1 | 8/2013 | White et al. |
| 2013/0227710 A1 | 8/2013 | Barak et al. |
| 2013/0232480 A1 | 9/2013 | Winterfeldt et al. |
| 2013/0239125 A1 | 9/2013 | Lorio |
| 2013/0262556 A1 | 10/2013 | Xu et al. |
| 2013/0263117 A1 | 10/2013 | Konik et al. |
| 2013/0275969 A1 | 10/2013 | Dimitrov |
| 2013/0275975 A1 | 10/2013 | Masuda et al. |
| 2013/0290538 A1 | 10/2013 | Gmach et al. |
| 2013/0297964 A1 | 11/2013 | Hegdal et al. |
| 2013/0339950 A1 | 12/2013 | Ramarathinam et al. |
| 2013/0346946 A1 | 12/2013 | Pinnix |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |

(56) References Cited

U.S. PATENT DOCUMENTS

| | | |
|---|---|---|
| 2014/0007097 A1 | 1/2014 | Chin et al. |
| 2014/0019523 A1* | 1/2014 | Heymann ......... G06F 17/30873 709/203 |
| 2014/0019735 A1 | 1/2014 | Menon et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0059209 A1* | 2/2014 | Alnoor ...................... G06F 9/54 709/224 |
| 2014/0059226 A1 | 2/2014 | Messerli et al. |
| 2014/0059552 A1 | 2/2014 | Cunningham et al. |
| 2014/0068611 A1 | 3/2014 | McGrath et al. |
| 2014/0082165 A1 | 3/2014 | Marr et al. |
| 2014/0101649 A1 | 4/2014 | Kamble et al. |
| 2014/0108722 A1 | 4/2014 | Lipchuk et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0201735 A1 | 7/2014 | Kannan et al. |
| 2014/0207912 A1 | 7/2014 | Thibeault |
| 2014/0215073 A1 | 7/2014 | Dow et al. |
| 2014/0245297 A1 | 8/2014 | Hackett |
| 2014/0279581 A1 | 9/2014 | Devereaux |
| 2014/0280325 A1 | 9/2014 | Krishnamurthy et al. |
| 2014/0282615 A1 | 9/2014 | Cavage et al. |
| 2014/0289286 A1 | 9/2014 | Gusak |
| 2014/0304698 A1 | 10/2014 | Chigurapati et al. |
| 2014/0304815 A1 | 10/2014 | Maeda |
| 2014/0317617 A1 | 10/2014 | O'Donnell |
| 2014/0380085 A1 | 12/2014 | Rash et al. |
| 2015/0039891 A1 | 2/2015 | Ignatchenko et al. |
| 2015/0040229 A1 | 2/2015 | Chan et al. |
| 2015/0046926 A1 | 2/2015 | Kenchammana-Hosekote et al. |
| 2015/0052258 A1 | 2/2015 | Johnson et al. |
| 2015/0058914 A1 | 2/2015 | Yadav |
| 2015/0074659 A1 | 3/2015 | Madsen et al. |
| 2015/0081885 A1 | 3/2015 | Thomas et al. |
| 2015/0106805 A1 | 4/2015 | Melander et al. |
| 2015/0120928 A1 | 4/2015 | Gummaraju et al. |
| 2015/0135287 A1 | 5/2015 | Medeiros et al. |
| 2015/0142952 A1 | 5/2015 | Bragstad et al. |
| 2015/0143381 A1 | 5/2015 | Chin et al. |
| 2015/0178110 A1* | 6/2015 | Li ...................... G06F 9/45558 718/1 |
| 2015/0186129 A1 | 7/2015 | Apte et al. |
| 2015/0188775 A1 | 7/2015 | Van Der Walt et al. |
| 2015/0199218 A1 | 7/2015 | Wilson et al. |
| 2015/0235144 A1 | 8/2015 | Gusev et al. |
| 2015/0242225 A1 | 8/2015 | Muller et al. |
| 2015/0256621 A1 | 9/2015 | Node et al. |
| 2015/0261578 A1 | 9/2015 | Greden et al. |
| 2015/0289220 A1 | 10/2015 | Kim et al. |
| 2015/0309923 A1 | 10/2015 | Iwata et al. |
| 2015/0319160 A1 | 11/2015 | Ferguson et al. |
| 2015/0332048 A1 | 11/2015 | Mooring et al. |
| 2015/0350701 A1 | 12/2015 | Lemus et al. |
| 2015/0356294 A1 | 12/2015 | Tan et al. |
| 2015/0363181 A1 | 12/2015 | Alberti et al. |
| 2015/0370560 A1 | 12/2015 | Tan et al. |
| 2015/0371244 A1 | 12/2015 | Neuse et al. |
| 2015/0378762 A1 | 12/2015 | Saladi et al. |
| 2015/0378764 A1 | 12/2015 | Sivasubramanian et al. |
| 2015/0378765 A1 | 12/2015 | Singh et al. |
| 2015/0379167 A1 | 12/2015 | Griffith et al. |
| 2016/0012099 A1 | 1/2016 | Tuatini et al. |
| 2016/0026486 A1 | 1/2016 | Abdallah |
| 2016/0072727 A1 | 3/2016 | Leafe et al. |
| 2016/0092250 A1 | 3/2016 | Wagner et al. |
| 2016/0092252 A1 | 3/2016 | Wagner |
| 2016/0098285 A1 | 4/2016 | Davis et al. |
| 2016/0100036 A1 | 4/2016 | Lo et al. |
| 2016/0117254 A1 | 4/2016 | Susarla et al. |
| 2016/0124665 A1 | 5/2016 | Jain et al. |
| 2016/0140180 A1 | 5/2016 | Park et al. |
| 2016/0191420 A1 | 6/2016 | Nagarajan et al. |
| 2016/0224360 A1 | 8/2016 | Wagner et al. |
| 2016/0224785 A1 | 8/2016 | Wagner et al. |
| 2016/0239318 A1 | 8/2016 | Wagner |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0299790 A1 | 10/2016 | Thompson |
| 2016/0301739 A1 | 10/2016 | Thompson |
| 2016/0350099 A1 | 12/2016 | Suparna et al. |
| 2016/0364265 A1 | 12/2016 | Cao et al. |
| 2016/0371127 A1 | 12/2016 | Antony et al. |
| 2016/0371156 A1 | 12/2016 | Merriman |
| 2016/0378554 A1* | 12/2016 | Gummaraju .......... G06F 9/5011 718/104 |
| 2017/0060621 A1 | 3/2017 | Whipple et al. |
| 2017/0083381 A1 | 3/2017 | Cong et al. |
| 2017/0085447 A1 | 3/2017 | Chen et al. |
| 2017/0093920 A1 | 3/2017 | Ducatel et al. |
| 2017/0116051 A1 | 4/2017 | Wagner et al. |
| 2017/0192804 A1 | 7/2017 | Wagner |
| 2017/0199766 A1 | 7/2017 | Wagner et al. |
| 2017/0206116 A1 | 7/2017 | Reque et al. |
| 2017/0286143 A1 | 10/2017 | Wagner et al. |
| 2017/0286156 A1 | 10/2017 | Wagner et al. |
| 2017/0371703 A1 | 12/2017 | Wagner et al. |
| 2017/0371724 A1 | 12/2017 | Wagner et al. |
| 2018/0004553 A1 | 1/2018 | Wagner et al. |
| 2018/0004572 A1 | 1/2018 | Wagner et al. |
| 2018/0039506 A1 | 2/2018 | Wagner et al. |
| 2018/0121245 A1 | 5/2018 | Wagner et al. |
| 2018/0143865 A1 | 5/2018 | Wagner et al. |
| 2018/0157568 A1 | 6/2018 | Wagner |
| 2018/0203717 A1 | 7/2018 | Wagner et al. |
| 2018/0210760 A1 | 7/2018 | Wisniewski et al. |
| 2018/0309819 A1 | 10/2018 | Thompson |
| 2019/0050271 A1 | 2/2019 | Marriner et al. |

FOREIGN PATENT DOCUMENTS

| | | |
|---|---|---|
| JP | 2006-107599 A | 4/2006 |
| JP | 2010-026562 A | 2/2010 |
| JP | 2011257847 A | 12/2011 |
| WO | WO 2008/114454 A1 | 9/2008 |
| WO | WO 2009/137567 A1 | 11/2009 |
| WO | WO 2012/050772 A1 | 4/2012 |
| WO | WO 2013/106257 A1 | 7/2013 |
| WO | WO 2015/078394 A1 | 6/2015 |
| WO | WO 2015/108539 A1 | 7/2015 |
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |
| WO | WO 2017/059248 A1 | 4/2017 |
| WO | WO 2017/112526 A1 | 6/2017 |
| WO | WO 2017/172440 A1 | 10/2017 |

OTHER PUBLICATIONS

Deis, Container, 2014 (Year: 2014).*

Adapter Pattern, Wikipedia, https://en.wikipedia.org/w/index.php?title=Adapter_pattern&oldid=654971255, [retrieved May 26, 2016], 6 pages.

Czajkowski, G., and L. Daynes, Multitasking Without Compromise: A Virtual Machine Evolution 47(4a):60-73, ACM SIGPLAN Notices—Supplemental Issue, Apr. 2012.

Dombrowski, M., et al., Dynamic Monitor Allocation in the Java Virtual Machine, JTRES '13, Oct. 9-11, 2013, pp. 30-37.

(56) References Cited

OTHER PUBLICATIONS

Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.
Nakajima, J., et al., Optimizing Virtual Machines Using Hybrid Virtualization, SAC '11, Mar. 21-25, 2011, TaiChung, Taiwan, pp. 573-578.
Qian, H., and D. Medhi, et al., Estimating Optimal Cost of Allocating Virtualized Resources With Dynamic Demand, ITC 2011, Sep. 2011, pp. 320-321.
Shim (computing), Wikipedia, https://en.wikipedia.org/w/index.php?title+Shim_(computing)&oldid+654971528, [retrieved on May 26, 2016], 2 pages.
Vaghani, S.B., Virtual Machine File System, ACM SIGOPS Operating Systems Review 44(4):57-70, Dec. 2010.
Vaquero, L., et al., Dynamically Scaling Applications in the cloud, ACM SIGCOMM Computer Communication Review 41(1):45-52, Jan. 2011.
Zheng, C., and D. Thain, Integrating Containers into Workflows: A Case Study Using Makeflow, Work Queue, and Docker, VTDC '15, Jun. 15, 2015, Portland, Oregon, pp. 31-38.
International Search Report and Written Opinion in PCT/US2015/052810 dated Dec. 17, 2015.
International Search Report and Written Opinion in PCT/US2015/052838 dated Dec. 18, 2015.
International Search Report and Written Opinion in PCT/US2015/052833 dated Jan. 13, 2016.
International Search Report and Written Opinion in PCT/US2015/064071 dated Mar. 16, 2016.
International Search Report and Written Opinion in PCT/US2016/016211 dated Apr. 13, 2016.
International Search Report and Written Opinion in PCT/US2016/026514 dated Jun. 8, 2016.
International Search Report and Written Opinion in PCT/US2016/026520 dated Jul. 5, 2016.
International Search Report and Written Opinion in PCT/US2016/054774 dated Dec. 16, 2016.
Anonymous: "Docker run reference", Dec. 7, 2015, XP055350246, Retrieved from the Internet: URL:https://web.archive.org/web/20151207111702/https://docs.docker.com/engine/reference/run/ [retrieved on Feb. 28, 2017].
Amazon, "AWS Lambda: Developer Guide", Retrieved from the Internet, Jun. 26, 2016, URL : http://docs.aws.amazon.com/lambda/latest/dg/lambda-dg.pdf.
Balazinska et al., Moirae: History-Enhanced Monitoring, Published: 2007, 12 pages.
Ben-Yehuda et al., "Deconstructing Amazon EC2 Spot Instance Pricing", ACM Transactions on Economics and Computation 1.3, 2013, 15 pages.
Das et al., Adaptive Stream Processing using Dynamic Batch Sizing, 2014, 13 pages.
Hoffman, Auto scaling your website with Amazon Web Services (AWS)—Part 2, Cardinalpath, Sep. 2015, 15 pages.
Kamga et al., Extended scheduler for efficient frequency scaling in virtualized systems, Jul. 2012, 8 pages.
Kazempour et al., AASH: an asymmetry-aware scheduler for hypervisors, Jul. 2010, 12 pages.
Kraft et al., 10 performance prediction in consolidated virtualized environments, Mar. 2011, 12 pages.
Krsul et al., "VMPlants: Providing and Managing Virtual Machine Execution Environments for Grid Computing", Supercomputing, 2004. Proceedings of the ACM/IEEESC 2004 Conference Pittsburgh, PA, XP010780332, Nov. 6-12, 2004, 12 pages.
Meng et al., Efficient resource provisioning in compute clouds via VM multiplexing, Jun. 2010, 10 pages.
Merkel, "Docker: Lightweight Linux Containers for Consistent Development and Deployment", Linux Journal, vol. 2014 Issue 239, Mar. 2014, XP055171140, 16 pages.
Monteil, Coupling profile and historical methods to predict execution time of parallel applications. Parallel and Cloud Computing, 2013, <hal-01228236, pp. 81-89.
Tan et al., Provisioning for large scale cloud computing services, Jun. 2012, 2 pages.
Yamasaki et al. "Model-based resource selection for efficient virtual cluster deployment", Virtualization Technology in Distributed Computing, ACM, Nov. 2007, pp. 1-7.
Yue et al., AC 2012-4107: Using Amazon EC2 in Computer and Network Security Lab Exercises: Design, Results, and Analysis, 2012, American Society for Engineering Education 2012.
International Preliminary Report on Patentability in PCT/US2015/052810 dated Apr. 4, 2017.
Extended Search Report in European Application No. dated May 3, 2018.
International Preliminary Report on Patentability in PCT/US2015/052838 dated Apr. 4, 2017.
International Preliminary Report on Patentability in PCT/US2015/052833 dated Apr. 4, 2017.
International Preliminary Report on Patentability in PCT/US2015/064071 dated Jun. 6, 2017.
International Preliminary Report on Patentability in PCT/US2016/016211 dated Aug. 17, 2017.
International Preliminary Report on Patentability in PCT/US2016/026514 dated Oct. 10, 2017.
International Preliminary Report on Patentability in PCT/US2016/026520 dated Oct. 10, 2017.
International Preliminary Report on Patentability in PCT/US2016/054774 dated Apr. 3, 2018.
International Search Report and Written Opinion in PCT/US2016/066997 dated Mar. 20, 2017.
International Preliminary Report on Patentability in PCT/US2016/066997 dated Jun. 26, 2018.
International Search Report and Written Opinion in PCT/US/2017/023564 dated Jun. 6, 2017.
International Search Report and Written Opinion in PCT/US2017/040054 dated Sep. 21, 2017.
International Search Report and Written Opinion in PCT/US2017/039514 dated Oct. 10, 2017.
Amazon, "AWS Lambda: Developer Guide", Retrieved from the Internet, 2019, URL : http://docs.aws.amazon.com/lambda/ latest/dg/lambda-dg.pdf, 521 pages.
Bhadani et al., Performance evaluation of web servers using central load balancing policy over virtual machines on cloud, Jan. 2010, 4 pages.
Han et al., Lightweight Resource Scaling for Cloud Applications, 2012, 8 pages.
Sakamoto, et al. "Platform for Web Services using Proxy Server"; Research Report from Information Processing Society, Mar. 22, 2002, vol. 2002, No. 31.
Extended Search Report in European Application No. 15847202.7 dated Sep. 9, 2018.
Extended Search Report in European Application No. 15846542.7 dated Aug. 27, 2018.
International Preliminary Report on Patentability in PCT/US/2017/023564 dated Oct. 2, 2018.
International Preliminary Report on Patentability in PCT/US2017/040054 dated Jan. 1, 2019.
International Preliminary Report on Patentability in PCT/US2017/039514 dated Jan. 1, 2019.

\* cited by examiner

STATEFUL VIRTUAL COMPUTE SYSTEM

RELATED APPLICATIONS

This application is a continuation of U.S. application Ser. No. 14/614,141, filed Feb. 4, 2015 and titled " STATEFUL VIRTUAL COMPUTE SYSTEM," the disclosure of which is hereby incorporated by reference in its entirety.

The present application's Applicant previously filed, Sep. 30, 2014, U.S. application Ser. No. 14/502,992 titled "THREADING AS A SERVICE," the disclosure of which is hereby incorporated by reference in its entirety.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
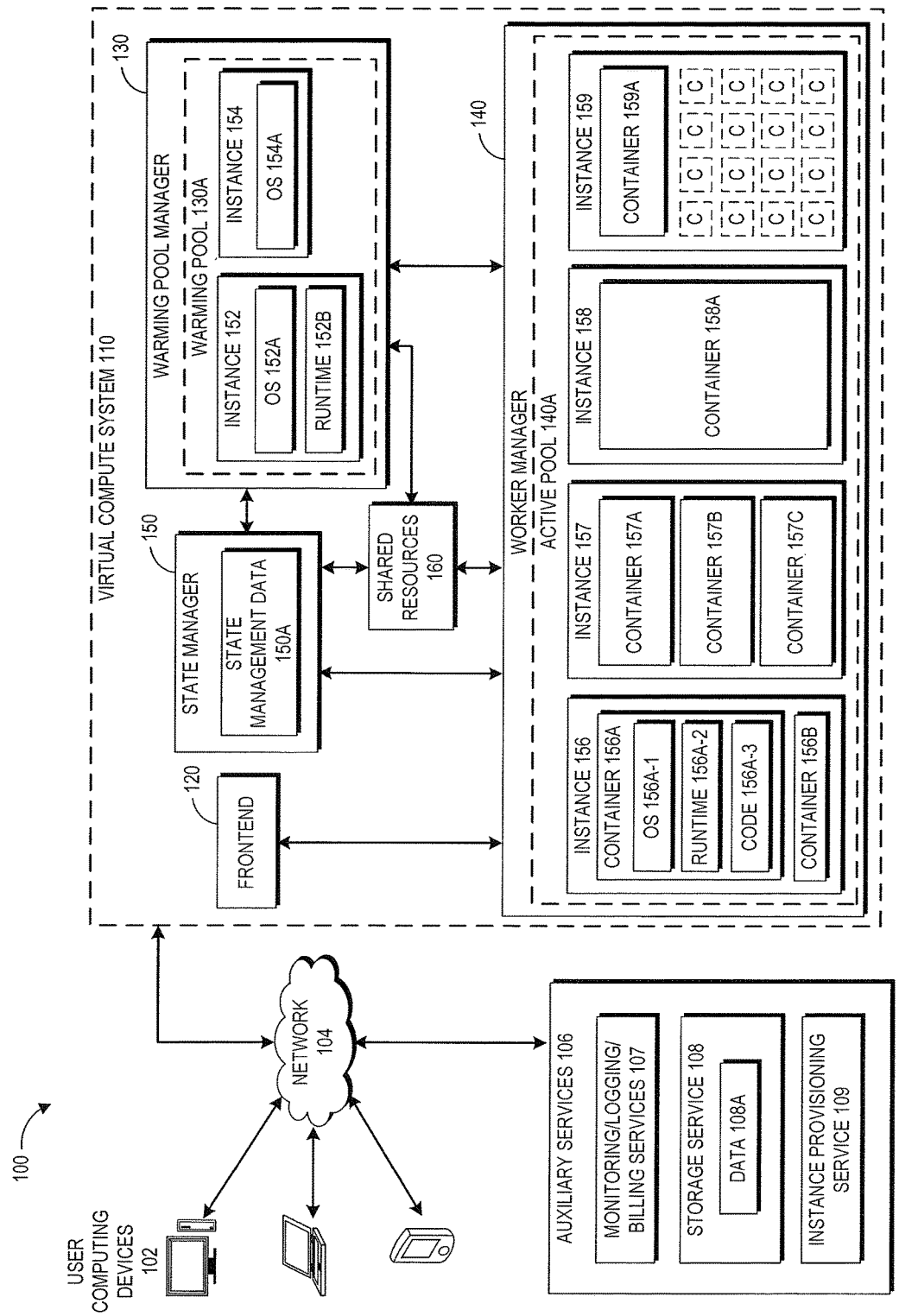
FIG. 1 is a block diagram depicting an illustrative environment for providing low latency compute capacity, according to an example aspect.

Companies and organizations no longer need to acquire and manage their own data centers in order to perform computing operations (e.g., execute code, including threads, programs, functions, software, routines, subroutines, processes, etc.). With the advent of cloud computing, storage space and compute power traditionally provided by hardware computing devices can now be obtained and configured in minutes over the Internet. Thus, developers can quickly purchase a desired amount of computing resources without having to worry about acquiring physical machines. Such computing resources are typically purchased in the form of virtual computing resources, or virtual machine instances. These instances of virtual machines are software implementations of physical machines (e.g., computers), which are hosted on physical computing devices, and may contain operating systems and applications that are traditionally provided on physical machines. These virtual machine instances are configured with a set of computing resources (e.g., memory, CPU, disk, network, etc.) that applications running on the virtual machine instances may request and can be utilized in the same manner as physical computers.

However, even when virtual computing resources are purchased (e.g., in the form of virtual machine instances), developers still have to decide how many and what type of virtual machine instances to purchase, and how long to keep them. For example, the costs of using the virtual machine instances may vary depending on the type and the number of hours they are rented. In addition, the minimum time a virtual machine may be rented is typically on the order of hours. Further, developers have to specify the hardware and software resources (e.g., type of operating systems and language runtimes, etc.) to install on the virtual machines. Other concerns that they might have include over-utilization (e.g., acquiring too little computing resources and suffering performance issues), under-utilization (e.g., acquiring more computing resources than necessary to run the codes, and thus overpaying), prediction of change in traffic (e.g., so that they know when to scale up or down), and instance and language runtime startup delay, which can take 3-10 minutes, or longer, even though users may desire computing capacity on the order of seconds or even milliseconds.

There may be services that provide such users with low latency compute capacity that can be utilized to execute their program codes by maintaining a pool of pre-initialized virtual machine instances that are ready for use as soon as a user request is received, delay (sometimes referred to as latency) associated with executing the user code (e.g., instance and language runtime startup time) can be significantly reduced.

However, depending on the implementation, such services may not allow multiple invocations of the user code or invocations of multiple user codes to share computing resources (e.g., memory, network, disk, etc.). For example, a user may wish to use multiple program codes to create and modify a common set of persistent data that is to outlive individual invocations of the program codes. In another example, the user may wish to allow some program codes to have access to common resources associated with the user. Thus, an improved method of allowing multiple invocations of program codes executed on a virtual compute system to share resources while maintaining low latency and high scalability is desired.

According to aspects of the present disclosure, by allowing certain resources to be shared across multiple invocations of one or more program codes, multiple instances, multiple users, and/or multiple services (e.g., customer-owned file system services), the virtual compute system can provide additional tools at the users' disposal at the programming level and allow the users to program their codes in a more convenient and/or simplified fashion.

Generally described, aspects of the present disclosure relate to the management of virtual machine instances and containers created therein. Specifically, systems and methods are disclosed which facilitate management of virtual machine instances in a virtual compute system. The virtual compute system maintains a pool of virtual machine instances that have one or more software components (e.g., operating systems, language runtimes, libraries, etc.) loaded thereon. Maintaining the pool of virtual machine instances may involve creating a new instance, acquiring a new instance from an external instance provisioning service, destroying an instance, assigning/reassigning an instance to a user, modifying an instance (e.g., containers or resources therein), etc. The virtual machine instances in the pool can be designated to service user requests to execute program codes. In the present disclosure, the phrases "program code," "user code," and "cloud function" may sometimes be interchangeably used. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

In another aspect, a virtual compute system may monitor and log information related to the amount of resources allocated for executing user code. By doing so, the virtual compute system may be able to identify opportunities for improving the performance of the user code execution by adjusting the amount of allocated resources. Error rates may be reduced by increasing the amount of allocated resources in the event of over-utilization, and costs associated with executing the user code may be reduced by decreasing the amount of allocated resources in the event of under-utilization.

Specific embodiments and example applications of the present disclosure will now be described with reference to the drawings. These embodiments and example applications are intended to illustrate, and not limit, the present disclosure.

With reference to FIG. 1, a block diagram illustrating an embodiment of a virtual environment 100 will be described. The example shown in FIG. 1 includes a virtual environment 100 in which users (e.g., developers, etc.) of user computing devices 102 may run various program codes using the virtual computing resources provided by a virtual compute system 110.

By way of illustration, various example user computing devices 102 are shown in communication with the virtual compute system 110, including a desktop computer, laptop, and a mobile phone. In general, the user computing devices 102 can be any computing device such as a desktop, laptop, mobile phone (or smartphone), tablet, kiosk, wireless device, and other electronic devices. In addition, the user computing devices 102 may include web services running on the same or different data centers, where, for example, different web services may programmatically communicate with each other to perform one or more techniques described herein. Further, the user computing devices 102 may include Internet of Things (IoT) devices such as Internet appliances and connected devices. The virtual compute system 110 may provide the user computing devices 102 with one or more user interfaces, command-line interfaces (CLI), application programing interfaces (API), and/or other programmatic interfaces for generating and uploading user codes, invoking the user codes (e.g., submitting a request to execute the user codes on the virtual compute system 110), scheduling event-based jobs or timed jobs, tracking the user codes, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The user computing devices 102 access the virtual compute system 110 over a network 104. The network 104 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. For example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The virtual compute system 110 is depicted in FIG. 1 as operating in a distributed computing environment including several computer systems that are interconnected using one or more computer networks. The virtual compute system 110 could also operate within a computing environment having a fewer or greater number of devices than are illustrated in FIG. 1. Thus, the depiction of the virtual compute system 110 in FIG. 1 should be taken as illustrative and not limiting to the present disclosure. For example, the virtual compute system 110 or various constituents thereof could implement various Web services components, hosted or "cloud" computing environments, and/or peer-to-peer network configurations to implement at least a portion of the processes described herein.

Further, the virtual compute system 110 may be implemented in hardware and/or software and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

In the environment illustrated FIG. 1, the virtual environment 100 includes a virtual compute system 110, which includes a frontend 120, a warming pool manager 130, a worker manager 140, and a state manager 150. In the depicted example, virtual machine instances ("instances") 152, 154 are shown in a warming pool 130A managed by the warming pool manager 130, and instances 156, 157, 158, 159 are shown in an active pool 140A managed by the worker manager 140. The illustration of the various components within the virtual compute system 110 is logical in nature and one or more of the components can be implemented by a single computing device or multiple computing devices. For example, the instances 152, 154, 156, 157, 158, 159 can be implemented on one or more physical computing devices in different various geographic regions. Similarly, each of the frontend 120, the warming pool manager 130, the worker manager 140, and the state manager 150 can be implemented across multiple physical computing devices. Alternatively, one or more of the frontend 120, the warming pool manager 130, the worker manager 140, and the state manager 150 can be implemented on a single physical computing device. In some embodiments, the virtual compute system 110 may comprise multiple frontends, multiple warming pool managers, multiple worker managers, and/or multiple capacity managers. Although six virtual machine instances are shown in the example of FIG. 1, the embodiments described herein are not limited as such, and one skilled in the art will appreciate that the virtual compute system 110 may comprise any number of virtual machine instances implemented using any number of physical computing devices. Similarly, although a single warming pool and a single active pool are shown in the example of FIG. 1, the embodiments described herein are not limited as such, and one skilled in the art will appreciate that the virtual compute system 110 may comprise any number of warming pools and active pools.

In the example of FIG. 1, the virtual compute system 110 is illustrated as being connected to the network 104. In some embodiments, any of the components within the virtual compute system 110 can communicate with other components (e.g., the user computing devices 102 and auxiliary services 106, which may include monitoring/logging/billing services 107, storage service 108, an instance provisioning service 109, and/or other services that may communicate with the virtual compute system 110) of the virtual environment 100 via the network 104. In other embodiments, not all components of the virtual compute system 110 are capable of communicating with other components of the virtual environment 100. In one example, only the frontend 120 may be connected to the network 104, and other components of the virtual compute system 110 may communicate with other components of the virtual environment 100 via the frontend 120.

Users may use the virtual compute system 110 to execute user code thereon. For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. Alternatively, the user may send a code execution request to the virtual compute system 110. The virtual compute system 110 can handle the acquisition and configuration of compute capacity (e.g., containers, instances, etc., which are described in greater detail below) based on the code execution request, and execute the code using the compute capacity. The virtual compute system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying).

The frontend 120 processes all the requests to execute user code on the virtual compute system 110. In one embodiment, the frontend 120 serves as a front door to all the other services provided by the virtual compute system 110. The frontend 120 processes the requests and makes sure that the requests are properly authorized. For example, the frontend 120 may determine whether the user associated with the request is authorized to access the user code specified in the request.

The user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific task, for example, in connection with a particular web application or mobile application developed by the user. For example, the user codes may be written in JavaScript (node.js), Java, Python, and/or Ruby. The request may include the user code (or the location thereof) and one or more arguments to be used for executing the user code. For example, the user may provide the user code along with the request to execute the user code. In another example, the request may identify a previously uploaded program code (e.g., using the API for uploading the code) by its name or its unique ID. In yet another example, the code may be included in the request as well as uploaded in a separate location (e.g., the storage service 108 or a storage system internal to the virtual compute system 110) prior to the request is received by the virtual compute system 110. The virtual compute system 110 may vary its code execution strategy based on where the code is available at the time the request is processed.

The frontend 120 may receive the request to execute such user codes in response to Hypertext Transfer Protocol Secure (HTTPS) requests from a user. Also, any information (e.g., headers and parameters) included in the HTTPS request may also be processed and utilized when executing the user code. As discussed above, any other protocols, including, for example, HTTP, MQTT, and CoAP, may be used to transfer the message containing the code execution request to the frontend 120. The frontend 120 may also receive the request to execute such user codes when an event is detected, such as an event that the user has registered to trigger automatic request generation. For example, the user may have registered the user code with an auxiliary service 106 and specified that whenever a particular event occurs (e.g., a new file is uploaded), the request to execute the user code is sent to the frontend 120. Alternatively, the user may have registered a timed job (e.g., execute the user code every 24 hours). In such an example, when the scheduled time arrives for the timed job, the request to execute the user code may be sent to the frontend 120. In yet another example, the frontend 120 may have a queue of incoming code execution requests, and when the user's batch job is removed from the virtual compute system's work queue, the frontend 120 may process the user request. In yet another example, the request may originate from another component within the virtual compute system 110 or other servers or services not illustrated in FIG. 1.

A user request may specify one or more third-party libraries (including native libraries) to be used along with the user code. In one embodiment, the user request is a ZIP file containing the user code and any libraries (and/or identifications of storage locations thereof). In some embodiments, the user request includes metadata that indicates the program code to be executed, the language in which the program code is written, the user associated with the request, and/or the computing resources (e.g., memory, CPU, storage, network packets, etc.) to be reserved for executing the program code. For example, the program code may be provided with the request, previously uploaded by the user, provided by the virtual compute system 110 (e.g., standard routines), and/or provided by third parties. In some embodiments, resource-level constraints (e.g., how much memory is to be allocated for executing a particular user code) are specified for the particular user code, and may not vary over each execution of the user code. In such cases, the virtual compute system 110 may have access to such resource-level constraints before each individual request is received, and the individual requests may not specify such resource-level constraints. In some embodiments, the resource-level constraints are adjusted over time and may vary across different executions of a single program code. For example, the same program code may be used to process two different sets of data, where one set of data requires more resources than the other. In such a case, the user may specify different resource constraints for the two different executions or the virtual compute system 110 may automatically adjust the amount of resources allocated to each execution of the program code based on spatial (e.g., in other parts of the virtual compute system 110) or historical (e.g., over time) trends for the user and/or program code. In some embodiments, the user request may specify other constraints such as permission data that indicates what kind of permissions that the request has to execute the user code. Such permission data may be used by the virtual compute system 110 to access private resources (e.g., on a private network).

In some embodiments, the user request may specify the behavior that should be adopted for handling the user request. In such embodiments, the user request may include an indicator for enabling one or more execution modes in which the user code associated with the user request is to be executed. For example, the request may include a flag or a header for indicating whether the user code should be executed in a debug mode in which the debugging and/or logging output that may be generated in connection with the execution of the user code is provided back to the user (e.g., via a console user interface). In such an example, the virtual compute system 110 may inspect the request and look for the flag or the header, and if it is present, the virtual compute system 110 may modify the behavior (e.g., logging facilities) of the container in which the user code is executed, and cause the output data to be provided back to the user. In some embodiments, the behavior/mode indicators are added to the request by the user interface provided to the user by the virtual compute system 110. Other features such as source code profiling, remote debugging, etc. may also be enabled or disabled based on the indication provided in the request.

In some embodiments, the virtual compute system 110 may include multiple frontends 120. In such embodiments, a load balancer may be provided to distribute the incoming requests to the multiple frontends 120, for example, in a round-robin fashion. In some embodiments, the manner in which the load balancer distributes incoming requests to the multiple frontends 120 may be based on the state of the warming pool 130A and/or the active pool 140A. For example, if the capacity in the warming pool 130A is deemed to be sufficient, the requests may be distributed to the multiple frontends 120 based on the individual capacities of the frontends 120 (e.g., based on one or more load balancing restrictions). On the other hand, if the capacity in the warming pool 130A is less than a threshold amount, one or more of such load balancing restrictions may be removed such that the requests may be distributed to the multiple frontends 120 in a manner that reduces or minimizes the number of virtual machine instances taken from the warming pool 130A. For example, even if, according to a load balancing restriction, a request is to be routed to Frontend A, if Frontend A needs to take an instance out of the warming pool 130A to service the request but Frontend B can use one of the instances in its active pool to service the same request, the request may be routed to Frontend B.

The warming pool manager 130 ensures that virtual machine instances are ready to be used by the worker manager 140 when the virtual compute system 110 receives a request to execute user code on the virtual compute system 110. In the example illustrated in FIG. 1, the warming pool manager 130 manages the warming pool 130A, which is a group (sometimes referred to as a pool) of pre-initialized and pre-configured virtual machine instances that may be used to service incoming user code execution requests. In some embodiments, the warming pool manager 130 causes virtual machine instances to be booted up on one or more physical computing machines within the virtual compute system 110 and added to the warming pool 130A. In other embodiments, the warming pool manager 130 communicates with an auxiliary virtual machine instance service (e.g., the instance provisioning service 109 of FIG. 1) to create and add new instances to the warming pool 130A. In some embodiments, the warming pool manager 130 may utilize both physical computing devices within the virtual compute system 110 and one or more virtual machine instance services to acquire and maintain compute capacity that can be used to service code execution requests received by the frontend 120. In some embodiments, the virtual compute system 110 may comprise one or more logical knobs or switches for controlling (e.g., increasing or decreasing) the available capacity in the warming pool 130A. For example, a system administrator may use such a knob or switch to increase the capacity available (e.g., the number of pre-booted instances) in the warming pool 130A during peak hours. In some embodiments, virtual machine instances in the warming pool 130A can be configured based on a predetermined set of configurations independent from a specific user request to execute a user's code. The predetermined set of configurations can correspond to various types of virtual machine instances to execute user codes. The warming pool manager 130 can optimize types and numbers of virtual machine instances in the warming pool 130A based on one or more metrics related to current or previous user code executions.

As shown in FIG. 1, instances may have operating systems (OS) and/or language runtimes loaded thereon. For example, the warming pool 130A managed by the warming pool manager 130 comprises instances 152, 154. The instance 152 includes an OS 152A and a runtime 152B. The instance 154 includes an OS 154A. In some embodiments, the instances in the warming pool 130A may also include containers (which may further contain copies of operating systems, runtimes, user codes, etc.), which are described in greater detail below. Although the instance 152 is shown in FIG. 1 to include a single runtime, in other embodiments, the instances depicted in FIG. 1 may include two or more runtimes, each of which may be used for running a different user code. In some embodiments, the warming pool manager 130 may maintain a list of instances in the warming pool 130A. The list of instances may further specify the configuration (e.g., OS, runtime, container, etc.) of the instances.

In some embodiments, the virtual machine instances in the warming pool 130A may be used to serve any user's request. In one embodiment, all the virtual machine instances in the warming pool 130A are configured in the same or substantially similar manner. In another embodiment, the virtual machine instances in the warming pool 130A may be configured differently to suit the needs of different users. For example, the virtual machine instances may have different operating systems, different language runtimes, and/or different libraries loaded thereon. In yet another embodiment, the virtual machine instances in the warming pool 130A may be configured in the same or substantially similar manner (e.g., with the same OS, language runtimes, and/or libraries), but some of those instances may have different container configurations. For example, two instances may have runtimes for both Python and Ruby, but one instance may have a container configured to run Python code, and the other instance may have a container configured to run Ruby code. In some embodiments, multiple warming pools 130A, each having identically-configured virtual machine instances, are provided.

The warming pool manager 130 may pre-configure the virtual machine instances in the warming pool 130A, such that each virtual machine instance is configured to satisfy at least one of the operating conditions that may be requested or specified by the user request to execute program code on the virtual compute system 110. In one embodiment, the operating conditions may include program languages in which the potential user codes may be written. For example, such languages may include Java, JavaScript, Python, Ruby, and the like. In some embodiments, the set of languages that the user codes may be written in may be limited to a predetermined set (e.g., set of 4 languages, although in some embodiments sets of more or less than four languages are provided) in order to facilitate pre-initialization of the virtual machine instances that can satisfy requests to execute user codes. For example, when the user is configuring a request via a user interface provided by the virtual compute system 110, the user interface may prompt the user to specify one of the predetermined operating conditions for executing the user code. In another example, the service-level agreement (SLA) for utilizing the services provided by the virtual compute system 110 may specify a set of conditions (e.g., programming languages, computing resources, etc.) that user requests should satisfy, and the virtual compute system 110 may assume that the requests satisfy the set of conditions in handling the requests. In another example, operating conditions specified in the request may include: the amount of compute power to be used for processing the request; the type of the request (e.g., HTTP vs. a triggered event); the timeout for the request (e.g., threshold time after which the request may be terminated); security policies (e.g., may control which instances in the warming pool 130A are usable by which user); and etc.

The worker manager 140 manages the instances used for servicing incoming code execution requests. In the example illustrated in FIG. 1, the worker manager 140 manages the active pool 140A, which is a group (sometimes referred to as a pool) of virtual machine instances that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's code in a container on a particular instance after another member's code has been executed in another container on the same instance does not pose security risks. Similarly, the worker manager 140 may assign the instances and the containers according to one or more policies that dictate which requests can be executed in which containers and which instances can be assigned to which users. An example policy may specify that instances are assigned to collections of users who share the same account (e.g., account for accessing the services provided by the virtual compute system 110). In some embodiments, the requests associated with the same user group may share the same containers (e.g., if the user codes associated therewith are identical). In some embodiments, a request does not differentiate between the different users of the group and simply indicates the group to which the users associated with the requests belong.

In the example illustrated in FIG. 1, user codes are executed in isolated compute systems referred to as containers. Containers are logical units created within a virtual machine instance using the resources available on that instance. For example, the worker manager 140 may, based on information specified in the request to execute user code, create a new container or locate an existing container in one of the instances in the active pool 140A and assigns the container to the request to handle the execution of the user code associated with the request. In one embodiment, such containers are implemented as Linux containers. The virtual machine instances in the active pool 140A may have one or more containers created thereon and have one or more program codes associated with the user loaded thereon (e.g., either in one of the containers or in a local cache of the instance).

As shown in FIG. 1, instances may have operating systems (OS), language runtimes, and containers. The containers may have individual copies of the OS and the language runtimes and user codes loaded thereon. In the example of FIG. 1, the active pool 140A managed by the worker manager 140 includes the instances 156, 157, 158, 159. The instance 156 has containers 156A, 156B. The container 156A has OS 156A-1, runtime 156A-2, and code 156A-3 loaded therein. In the depicted example, the container 156A has its own OS, runtime, and code loaded therein. In one embodiment, the OS 156A-1 (e.g., the kernel thereof), runtime 156A-2, and/or code 156A-3 are shared among the containers 156A, 156B (and any other containers not illustrated in FIG. 1). In another embodiment, the OS 156A-1

(e.g., any code running outside the kernel), runtime 156A-2, and/or code 156A-3 are independent copies that are created for the container 156A and are not shared with other containers on the instance 156. In yet another embodiment, some portions of the OS 156A-1, runtime 156A-2, and/or code 156A-3 are shared among the containers on the instance 156, and other portions thereof are independent copies that are specific to the container 156A. The instance 157 includes containers 157A, 157B, 157C, the instance 158 includes a container 158A, and the instance 159 includes a container 159A.

In the example of FIG. 1, the sizes of the containers depicted in FIG. 1 may be proportional to the actual size of the containers. For example, the container 156A occupies more space than the container 156B on the instance 156. Similarly, the containers 157A, 157B, 157C, 159A may be equally sized, and the container 158A may be larger (e.g., have more computing resources allocated thereto) than the containers 157A, 157B, 157C, 159A. The dotted boxes labeled "C" shown in the instance 159 indicate the space remaining on the instances that may be used to create new instances. In some embodiments, the sizes of the containers may be 64MB or any multiples thereof. In other embodiments, the sizes of the containers may be any arbitrary size smaller than or equal to the size of the instances in which the containers are created. In some embodiments, the sizes of the containers may be any arbitrary size smaller than, equal to, or larger than the size of the instances in which the containers are created. By how much the sizes of the containers can exceed the size of the instance may be determined based on how likely that those containers might be utilized beyond the capacity provided by the instance. For example, five containers having a memory size of 1 GB (5 GB in total) may be created in an instance having a memory size of 4 GB. If each of the containers does not reach the full capacity of 1 GB, the containers may function properly despite the over-subscription.

Although the components inside the containers 156B, 157A, 157B, 157C, 158A, 159A are not illustrated in the example of FIG. 1, each of these containers may have various operating systems, language runtimes, libraries, and/or user code. In some embodiments, instances may have user codes loaded thereon (e.g., in an instance-level cache), and containers within those instances may also have user codes loaded therein. In some embodiments, the worker manager 140 may maintain a list of instances in the active pool 140A. The list of instances may further specify the configuration (e.g., OS, runtime, container, etc.) of the instances. In some embodiments, the worker manager 140 may have access to a list of instances in the warming pool 130A (e.g., including the number and type of instances). In other embodiments, the worker manager 140 requests compute capacity from the warming pool manager 130 without having knowledge of the virtual machine instances in the warming pool 130A.

After a request has been successfully processed by the frontend 120, the worker manager 140 finds capacity to service the request to execute user code on the virtual compute system 110. For example, if there exists a particular virtual machine instance in the active pool 140A that has a container with the same user code loaded therein (e.g., code 156A-3 shown in the container 156A), the worker manager 140 may assign the container to the request and cause the user code to be executed in the container. Alternatively, if the user code is available in the local cache of one of the virtual machine instances (e.g., stored on the instance 158 but do not belong to any individual containers), the worker manager 140 may create a new container on such an instance, assign the container to the request, and cause the user code to be loaded and executed in the container.

If the worker manager 140 determines that the user code associated with the request is not found on any of the instances (e.g., either in a container or the local cache of an instance) in the active pool 140A, the worker manager 140 may determine whether any of the instances in the active pool 140A is currently assigned to the user associated with the request and has compute capacity to handle the current request. If there is such an instance, the worker manager 140 may create a new container on the instance and assign the container to the request. Alternatively, the worker manager 140 may further configure an existing container on the instance assigned to the user, and assign the container to the request. For example, the worker manager 140 may determine that the existing container may be used to execute the user code if a particular library demanded by the current user request is loaded thereon. In such a case, the worker manager 140 may load the particular library and the user code onto the container and use the container to execute the user code.

If the active pool 140A does not contain any instances currently assigned to the user, the worker manager 140 pulls a new virtual machine instance from the warming pool 130A, assigns the instance to the user associated with the request, creates a new container on the instance, assigns the container to the request, and causes the user code to be downloaded and executed on the container.

In some embodiments, the virtual compute system 110 is adapted to begin execution of the user code shortly after it is received (e.g., by the frontend 120). A time period can be determined as the difference in time between initiating execution of the user code (e.g., in a container on a virtual machine instance associated with the user) and receiving a request to execute the user code (e.g., received by a frontend). The virtual compute system 110 is adapted to begin execution of the user code within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the virtual compute system 110 is adapted to begin execution of the user code within a time period that is less than a predetermined duration if one or more conditions are satisfied. For example, the one or more conditions may include any one of: (1) the user code is loaded on a container in the active pool 140A at the time the request is received; (2) the user code is stored in the code cache of an instance in the active pool 140A at the time the request is received; (3) the active pool 140A contains an instance assigned to the user associated with the request at the time the request is received; or (4) the warming pool 130A has capacity to handle the request at the time the request is received.

The user code may be downloaded from an auxiliary service 106 such as the storage service 108 of FIG. 1. Data 108A illustrated in FIG. 1 may comprise user codes uploaded by one or more users, metadata associated with such user codes, or any other data utilized by the virtual compute system 110 to perform one or more techniques described herein. Although only the storage service 108 is illustrated in the example of FIG. 1, the virtual environment 100 may include other levels of storage systems from which the user code may be downloaded. For example, each instance may have one or more storage systems either physically (e.g., a local storage resident on the physical computing system on which the instance is running) or logically (e.g., a network-attached storage system in network communication with the instance and provided within or outside of the virtual compute system 110) associated with the instance on which the container is created. Alternatively, the code may be downloaded from a web-based data store provided by the storage service 108.

Once the worker manager 140 locates one of the virtual machine instances in the warming pool 130A that can be used to serve the user code execution request, the warming pool manager 130 or the worker manager 140 takes the instance out of the warming pool 130A and assigns it to the user associated with the request. The assigned virtual machine instance is taken out of the warming pool 130A and placed in the active pool 140A. In some embodiments, once the virtual machine instance has been assigned to a particular user, the same virtual machine instance cannot be used to service requests of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity. In some embodiments, the virtual compute system 110 may maintain a separate cache in which user codes are stored to serve as an intermediate level of caching system between the local cache of the virtual machine instances and a web-based network storage (e.g., accessible via the network 104).

After the user code has been executed, the worker manager 140 may tear down the container used to execute the user code to free up the resources it occupied to be used for other containers in the instance. Alternatively, the worker manager 140 may keep the container running to use it to service additional requests from the same user. For example, if another request associated with the same user code that has already been loaded in the container, the request can be assigned to the same container, thereby eliminating the delay associated with creating a new container and loading the user code in the container. In some embodiments, the worker manager 140 may tear down the instance in which the container used to execute the user code was created. Alternatively, the worker manager 140 may keep the instance running to use it to service additional requests from the same user. The determination of whether to keep the container and/or the instance running after the user code is done executing may be based on a threshold time, the type of the user, average request volume of the user, and/or other operating conditions. For example, after a threshold time has passed (e.g., 5 minutes, 30 minutes, 1 hour, 24 hours, 30 days, etc.) without any activity (e.g., running of the code), the container and/or the virtual machine instance is shutdown (e.g., deleted, terminated, etc.), and resources allocated thereto are released. In some embodiments, the threshold time passed before a container is torn down is shorter than the threshold time passed before an instance is torn down.

In some embodiments, the virtual compute system 110 may provide data to one or more of the auxiliary services 106 as it services incoming code execution requests. For example, the virtual compute system 110 may communicate with the monitoring/logging/billing services 107. The monitoring/logging/billing services 107 may include: a monitoring service for managing monitoring information received from the virtual compute system 110, such as statuses of containers and instances on the virtual compute system 110; a logging service for managing logging information received from the virtual compute system 110, such as activities performed by containers and instances on the virtual compute system 110; and a billing service for generating billing information associated with executing user code on the virtual compute system 110 (e.g., based on the monitoring information and/or the logging information managed by the monitoring service and the logging service). In addition to the system-level activities that may be performed by the monitoring/logging/billing services 107 (e.g., on behalf of the virtual compute system 110) as described above, the monitoring/logging/billing services 107 may provide application-level services on behalf of the user code executed on the virtual compute system 110. For example, the monitoring/logging/billing services 107 may monitor and/or log various inputs, outputs, or other data and parameters on behalf of the user code being executed on the virtual compute system 110. Although shown as a single block, the monitoring, logging, and billing services 107 may be provided as separate services. The monitoring/logging/billing services 107 may communicate with the state manager 150 to allow the state manager 150 to determine the appropriate amount of resources to be used for executing the various program codes on the virtual compute system 150.

In some embodiments, the worker manager 140 may perform health checks on the instances and containers managed by the worker manager 140 (e.g., those in the active pool 140A). For example, the health checks performed by the worker manager 140 may include determining whether the instances and the containers managed by the worker manager 140 have any issues of (1) misconfigured networking and/or startup configuration, (2) exhausted memory, (3) corrupted file system, (4) incompatible kernel, and/or any other problems that may impair the performance of the instances and the containers. In one embodiment, the worker manager 140 performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests. In some embodiments, the worker manager 140 may perform similar health checks on the instances and/or containers in the warming pool 130A. The instances and/or the containers in the warming pool 130A may be managed either together with those instances and containers in the active pool 140A or separately. In some embodiments, in the case where the health of the instances and/or the containers in the warming pool 130A is managed separately from the active pool 140A, the warming pool manager 130, instead of the worker manager 140, may perform the health checks described above on the instances and/or the containers in the warming pool 130A.

The state manager 150 manages resources available on the virtual compute system 110 or other resources associated with the users of the virtual compute system 110 in a "stateful" fashion. In a stateless model, program codes would have no memory or information of what occurred prior to the execution of the program codes. For example, in such a model, resource sharing between multiple invocations of one or more program codes may not be allowed, and the only way in which two different program codes may share values or work together (e.g., one program code calculates a number that is used in the execution of the other)

might be for the first program code to call the second program code and wait around until the second program code returns a value needed by the first program code. On the other hand, a stateful model has the capability to maintain "state" (e.g., the data generated, modified, or stored by the program codes in a storage location), and therefore, program codes may have access to data or other resources that result from previous or concurrent occurrences. For example, if these two program codes were allowed to share data, variables, or resources between them, either in an ephemeral manner (e.g., any shared resources disappearing after the executions of the program codes are completed or a threshold time period thereafter) or a persistent manner (e.g., the shared resources remaining intact after the program codes accessing the shared resources are completed or without being tied to the status of individual program codes or instances), the program codes can work at their own pace, without worrying about whether any data that they generated will be accessible by other program codes.

For example, in the case where the program codes associated with a particular user share a file system, the state manager 150 may configure the virtual compute system 110 such that for the particular user, every time a program code associated with the particular user is executed on the virtual compute system 110, the program code would be connected to the same file system, and the file system would in the same state that the previous execution of the program code left it (e.g., when the previous invocation of the program code finished running). The subsequent execution of the program code would be able to access the same data in the file system that the previous execution had access to, and the subsequent execution can continue where the previous execution left off, if desired, without having to build a new set of data in a new file system that might vanish after the subsequent execution is completed. For example, the particular user may devise the program code such that the program code utilizes the shared file system to cache information to perform interim computations, and/or utilizes the shared file system as a durable store to store persistent data that may be accessed by one or more executions of the program code. Thus, the virtual compute system 110 can simplify the users' coding process (e.g., by providing a built-in file system that is shared among multiple code executions, for which the users need not worry about any service-specific coding tools) also provide improved latency performance (e.g., since the shared file system would be less costly to access than an external storage service).

The state manager 150 may allow spatial sharing, temporal sharing, or both. For example, for spatial sharing, if a particular user has two or more program codes running on the virtual compute system 110, regardless of whether the program codes are running in the same instance or not, the state manager 150 may allow the program codes to share the same computing resources (e.g., memory, file system, network, etc.). For temporal sharing, if a particular user sends the virtual compute system 110 a request to execute a program code today and then sends another request to execute the same program code tomorrow, the state manager 150 may allow the program code being executed tomorrow to access the same computing resources that the program code being executed today may access.

The state manager 150 may perform certain configuration routines on the instances being pulled out of the warming pool 130A so that the program codes being executed in the instances may be able to access the shared resources (e.g., shared resources 160). For example, if the state manager 150 (or another component in the virtual compute system 110) determines that the virtual compute system 110 does not have sufficient capacity in the active pool 140A to handle a new incoming request, the state manager 150 may look in the warming pol 130A to acquire additional capacity. When a new instance is assigned from the warming pool 130A, the state manager 150 may configure the instance such that the instance has access to one or more shared resources. For example, after an instance is selected from the warming pool 130A to be assigned to a particular user, the state manager 150 determine, based on information (e.g., the user account's metadata) associated with the particular user, what kind of shared resources (e.g., which network-attached drives, which public or private networks, which file systems, which key/value stores, etc., that the selected instance should be allowed to access) shared the program codes running on the selected instance would be allowed to access. Based on the determination, the state manager 150 may associate one or more existing shared resources with the selected instance or create (e.g., based on a determination that one or more shared resources are not present on the virtual compute system 110) new shared resources (e.g., by setting up a new key/value store, attaching a new file system, setting up a network peering, etc.) and associate the created shared resources with the selected instance. Configuring an instance in a way that allows the instance to have access to a shared resource is described in the present application as "associating" the shared resource with the instance, which may include, but is not limited to, constructing a new shared resource and attaching the shared resource to the instance, attaching an existing shared resource to the instance, establishing a connection between the instance and a shared resource, recording the association between the instance and a shared resource in a database, etc. In the present application, a program code may also be described as being associated with a shared resource, which may indicate that invocations or executions of the program code may have access to the shared resource. For example, to allow the selected instance to have access to a private network of the particular user, the state manager 150 may send a request to the private network (e.g., a virtual private network of the particular user) associated with the user, along with any necessary credentials, to set up a peering connection, which would effectively cause the selected instance to be part of the private network of the user and have access to any private resources available on the private network. The state manager 150 may repeat a similar process to set up a connection among multiple private networks. In another example, the state manager 150 may establish an NFSv4 (Network File System version 4) file sharing using the appropriate client/server protocols for the selected instance.

The lifetime of the shared resource may be tied to the lifetime of the virtual machine instance with which the shared resource is associated (e.g., configured to utilize and access). For example, if an instance is selected from the warming pool 130A and associated with a shared resource, the shared resource may be terminated, disconnected, or otherwise become unavailable for use when the instance is terminated. In some embodiments, the lifetime of a shared resource is tied to the lifetime of one or more containers running the program code. For example, if the state manager 150 detects that a new request to execute a program code on the virtual compute system 110 is to utilize a shared resource, the state manager 150 may select an instance (e.g., one that has already been associated with the user associated with the program code) from an active pool 140A, and configure the instance such that one or more containers running the program code have access to the shared resource (e.g., by setting up a new key/value store, attaching a new file system, setting up a network peering). In such embodiments, the lifetime of the shared resource may be tied to the lifetime of the one or more containers running the program code, and once the instance of the program code or once the last container running the program code vanishes from the instance, the shared resource becomes no longer accessible (e.g., terminated, disconnected, removed, deleted, etc.).

The association between the shared resources and the selected instance may be recorded in the virtual compute system 110 as state management data (e.g., state management data 150A). After the instance is configured to have access to shared resources, containers can be created in the instance to service the code execution requests, as described above with reference to the worker manager 140.

In one embodiment, the amount of time that the state manager 150 takes to configure a particular instance for resource sharing is about 10 ms. In another embodiment, the amount of time that the state manager 150 takes to configure a particular instance for resource sharing is about 100 ms. In yet another embodiment, the amount of time that the state manager 150 takes to configure a particular instance for resource sharing is about 1,000 ms. In some embodiments, the amount of time that the state manager 150 takes to configure a particular instance is about an order of magnitude greater than the amount of time that the virtual compute system 110 takes to initiate execution of a program code after a request to execute the program code is received. In some embodiments, the amount of time that the state manager 150 takes to configure a particular instance is about two orders of magnitude greater than the amount of time that the virtual compute system 110 takes to initiate execution of a program code after a request to execute the program code is received.

Similarly, the techniques can be extended, beyond cross-invocation sharing of the program codes, to cross-code sharing, cross-instance sharing, cross-user account sharing, and even cross-service sharing. For example, in addition to multiple invocations of a single piece of code being allowed to access shared resources, multiple program codes executed on the same instance, multiple instances on the virtual compute system 110, and/or multiple services (e.g., internal or external to the virtual compute system 110 that may be owned by the users) can be allowed to access the same shared resources. The shared resources can be provided entirely by the virtual compute system 110, partially by the virtual compute system 110, or entirely provided by an entity external to the virtual compute system 110. For example, an enterprise user may have its own file system that it would like its program codes executed on the virtual compute system 110 to be able to access. In such a case, the user-owned file system can be tied to one or more instances and shared among the program codes executed on those instances. In one embodiment, user-owned resources (e.g., not owned and managed by the virtual compute system 110) may be mounted read-only such that program codes running on the virtual compute system 110 has read access to the data available on the user-owned resources. In another embodiment, the virtual compute system 110 may maintain a copy of the data available on the user-owned resources and allow access to the copy. In some embodiments, modifications made to the copy may be propagated to the original data in the user-owned resources. In yet another embodiment, the virtual compute system 110 may allow full access to the user-owned resources.

In some embodiments, the state manager 150 may partition the virtual compute system 110 (e.g., the instances in the active pool 140A) based on the nature of the program codes or the users associated with the requests. For example, if the program codes do not share the same set of shared resources (e.g., the same private network, the same file system access point, and/or the same key/value store, etc.), then the state manager 150 may route the requests such that the requests associated with those program codes land in different virtual machine instances. The state manager 150 may divide up the requests, program codes, and/or users based on one or more security policies stored as resource management data 150A (e.g., specified by the users and/or system administrators). In some embodiments, program codes that are executed in the same instance have access to the same set of shared resources. In other embodiments, each program code executed in the same instance may have its own unique set of shared resources, where at least a portion of those resources are not shared with all the program codes executed in the instance.

In some embodiments, the users may specify what kind of shared resources that the user wants his or her program codes to be able to access at the time the program codes are registered with the virtual compute system 110. For example, a user may indicate that he wants his code #1 to be able to access his virtual private cloud (VPC) #1 and his file system A and his code #2 to be able to access his VPC #2 and his file system A. Upon receiving such user specification of the shared resources for their program codes, the state manager 150 may check whether the users actually have access to the specified shared resources.

The state manager 150 may isolate a portion of the shared resources and grant a particular instance access to the isolated portion of the shared resources. For example, the state manager 150 may carve out a portion of the shared file system (e.g., using chroot jail) and allow a particular program code to have access to the carved out portion of the shared file system. For example, the file system may be divided among the users (e.g., /user1, /user2, etc.), and further subdivided among the program codes (e.g., /user1/code001, /user1/code002, etc.). Multiple invocations of the particular program code, regardless of the containers in which the invocations are processed, may have access to the carved out portion of the shared file system. In some embodiments, invocations of the particular program code can share the same portion of the file system only if the invocations are in the same instance. After the instance is set up to handle resource sharing, additional requests processed in the instance would not have to go through the setup process that may take up to 1 to 2 seconds.

By performing the setup at the instance level and not at the container level or request level, the benefits of having states and allowing shared resources can be achieved while minimizing the latency hit resulting from implementing resource sharing.

In some embodiments, once a particular instance is configured for resource sharing, one or more security policies may limit the program codes that may be placed in the particular instance. For example, the state manager 150 may ensure that only program codes that are supposed to have access to the shared resources (e.g., a set of files that are shared among multiple invocations of the same or different program codes) associated with the particular instance are placed in the particular instance.

In some embodiments, instances that have been idle (e.g., no code is being executed in the instance) for a threshold amount of time are terminated. For example, the virtual compute system 110 may impose a 6-hour limit on the instances. When an instance is terminated, any shared resources associated with the instance are also disassociated from the instance. For example, if the instance has been connected to a private network, the connection is removed. If the instance has been connected to a shared file system, the instance is now disconnected from the shared file system. In some embodiments, when the association between the instance and the shared resources is removed, any data created or modified by the program codes running on the instance may also be removed from the shared resources. A similar removal procedure may be performed when an instance is being terminated due to poor health.

In some embodiments, the state manager 150 creates copies of the shared resources to improve the durability of any data generated or modified by the program codes executing on the virtual compute system 110. In one embodiment, the state manager 150 may use a single data cache server to implement the shared memory. In such an embodiment, if the single server fails, the data managed by the server may be lost. In another embodiment, the state manager 150 may maintain multiple copies of the data stored on the shared memory across multiple zones, geographic locations, racks, power grids, etc. for increased durability. In such an embodiment, even in the event of a power outage, for example, a copy of the key/value pairs can be retrieved elsewhere and delivered to the appropriate program codes. In some embodiments, the state manager 150 determines an appropriate number of copies of the data to be generated based on the number of program codes executing on the virtual compute system 110, the amount of data stored in the shared memory, and/or the significance or worth of the data.

In some embodiments, the shared resources managed by the state manager 150 may comprise a shared memory. In one embodiment, the shared memory may be implemented as a distributed memory cache that stores, for example, variables utilized by the program codes or results of computations performed the program codes. In another embodiment, the shared memory is implemented as integrated key/value stores (or hash tables) such that, when program codes run on the virtual compute system 110, they have a section of the memory which is shared among the program codes. The shared memory may be implemented at the programming language level such that they can read, write, and share values over shared keys. In some embodiments, the shared memory is persistent in the sense that the key/value pairs stored by a program code is still there when a subsequent program code runs. For example, program code #1 can set a variable to a certain value, and program code #2 running sometime after program code #1 has finished running can access the variable and retrieve the value associated with the variable. In other embodiments, the shared memory is transient in the sense that only the program code currently running can meaningfully utilize the key/value pairs stored in the shared memory (e.g., like a session state). The state manager 150 may attach the instances to one or more external services (e.g., auxiliary services 106) to ensure that the data persists through multiple invocations of the program code. In some embodiments, the state manager 150 may implement the shared memory as hash tables that are pushed to the local cache of each program code. For example, every time one program code modifies the shared data, the state manager 150 retrieves the modified data from the local cache of the program code and pushes the modified data to the local caches of the other program codes having access to the shared memory. Thus, the hash table may synchronize itself with each program code (or a subset of the program codes) running on the virtual compute system 110.

In some embodiments, the state manager 150 may utilize one or more shared resources (e.g., a SQL database) that may involve a connection establishment time that is much higher than the time that the virtual compute system 110 takes to receive a request and initiate the execution of the code associated with the request. In order to avoid having to establish a new connection for every program code received by the virtual compute system 110, the state manager 150 establish and maintain a connection pool that can be shared by multiple program codes that are executed on the virtual compute system 110. Similarly, the state manager 150 may establish and maintain dedicated caches that are located between the instances and one or more external services (e.g., auxiliary services 106).

In some embodiments, the shared resource managed by the state manager 150 may comprise a shared disk. For example, the shared disk may include a distributed persistent shared file system shared among multiple program codes (e.g., any program code can write to the file system, and other program codes can access the data written by the program code). As discussed above, invocations of the same code or different codes may see the same file system, both temporally (e.g., sequential execution) and spatially (e.g., simultaneous execution in different containers). For example, after a new instance is pulled from the warming pool 130A, the instance can be associated with a shared file system that may be accessed by any program code belonging to the particular user executed in the instance.

In some embodiments, the state manager 150 may use the shared disk (e.g., network-attached disk drive) as a program code delivery mechanism. For example, the state manager 150 may divide up the shared disk into multiple partitions and use the partitions to distribute different program codes running on the virtual compute system 110. In some embodiments, the shared disk is implemented using a cloud-based file system. In such embodiments, each program code would have access to a local drive having a virtually infinite amount of capacity. For large enterprises, such an implementation may be useful for managing hundreds or thousands of program codes that the enterprise might have. In some embodiments, the code delivery using the shared disk is faster than the code delivery using an external code repository by about an order of magnitude.

One example use of the distributed file system is to use the shared disk as scratch space for storing internal documents or performing interim computations. For example, static images like watermarks are not really the end products for users to view or download. Such static images typically just need to be read and applied by the program code and need not be maintained in an external storage service accessible by the users. Thus, the internal shared disk may be used to store such data to improve the latency associated with retrieving such data. In some embodiments, program codes can use the distributed file system for any interim computations, but store the final product with an external storage service (e.g., storage service 108).

In some embodiments, the shared resource managed by the state manager 150 may comprise a shared network. For example, the users may wish to allow some or all of the program codes that they execute on the virtual compute system 110 to share data or other resources available on their private networks (e.g., virtual private cloud). As discussed above, in some embodiments, the user request to execute user code on the virtual compute system 110 may specify permission data that indicates what kind of permissions that the request has to execute the user code. The virtual compute system 110 may use the permission data to access private resources (e.g., relational databases or other virtual machine instances that the user owns) on one or more networks associated with the user. Alternatively, the state management data 150A maintained by the state manager 150 may include permission data or other information regarding the network resources available to particular users, user groups, user codes, etc., and the state manager 150 may use such data or information to access private resources on one or more networks associated with the particular user, user account, user code, etc.

The private network associated with the user may already have security features implemented, and thus, the user does not have to worry about securing the network again once the virtual machine instance is associated with the private network. Thus, by granting the program codes running in the virtual machine instance access to the user's private network, the virtual compute system 110 provides the security of a private network and also the ease of access at the same time.

In some embodiments, the state manager 150 may create local networks between processes that are running the same program code to facilitate the resource sharing between them. The state manager 150 may extend a similar technique to implement a connection between multiple instances.

The state manager 150 may communicate with the frontend 120, the warming pool manager 130, the worker manager 140, the shared resources 160, and/or the auxiliary services 106 to monitor and manage the compute capacity allocated to (and used by) the various program codes executed on the virtual compute system 110. Although the state manager 150 is illustrated as a distinct component within the virtual compute system 110, part or all of the functionalities of the state manager 150 may be performed by the frontend 120, the warming pool manager 130, the worker manager 140, the shared resources 160, and/or the auxiliary services 106. For example, the state manager 150 may be implemented entirely within one of the other components of the virtual compute system 110 or in a distributed manner across the other components of the virtual compute system 110. In the example of FIG. 1, the state manager 150 includes state management data 150A. The state management data 150A may include data regarding the association among the various users, user accounts, program codes, etc. that utilize the virtual compute system 110 and the shared resources available on the virtual compute system 110 or other external resources outside the virtual compute system 110. For example, the state management data 150A may indicate which memory, disk, and/or network resources a particular user may access. The state management data 150A may further include security policies that may be used by the state manager 150 to divide up certain requests, program codes, and/or instances. For example, a security policy may indicate that a user having access to a particular private network or private cloud can share an instance with another user only if the other user also has access to the particular private network or private cloud. The information included in the state management data 150A may be extracted from the code execution requests received by the virtual compute system 110, or provided by the user separately from the code execution requests.

The state manager 150 may include a shared resource management unit for managing the different kinds of shared resources associated with particular users and/or program codes, and an instance configuration unit for configuring the instances being acquired from the warming pool 130A such that they are fit to use the shared resources. An example configuration of the state manager 150 is described in greater detail below with reference to FIG. 2.

Figure 2:
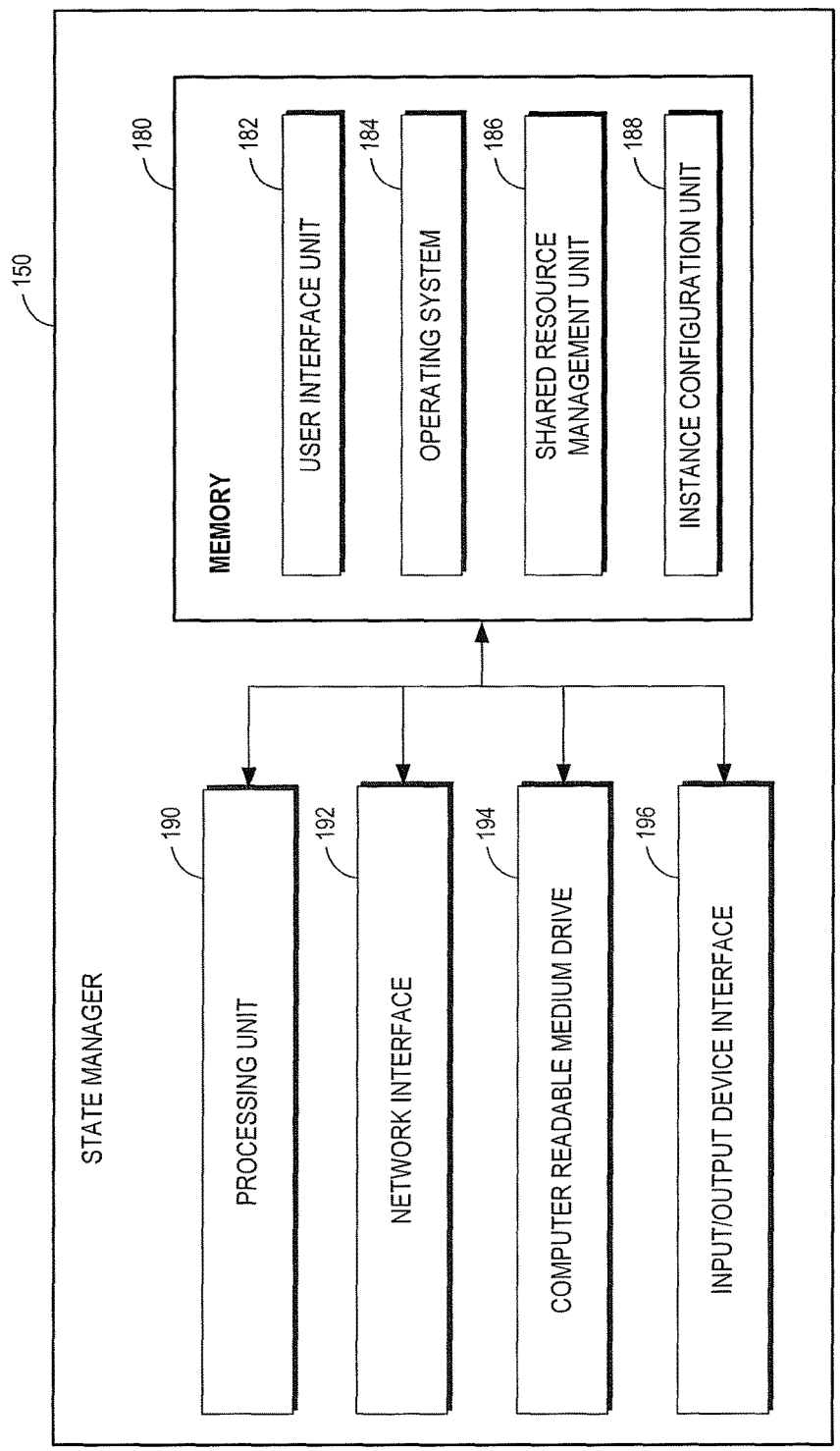
FIG. 2 depicts a general architecture of a computing device providing a state manager for managing low latency compute capacity, according to an example aspect.

FIG. 2 depicts a general architecture of a computing system (referenced as state manager 150) that manages the virtual machine instances in the virtual compute system 110. The general architecture of the state manager 150 depicted in FIG. 2 includes an arrangement of computer hardware and software modules that may be used to implement aspects of the present disclosure. The state manager 150 may include many more (or fewer) elements than those shown in FIG. 2. It is not necessary, however, that all of these generally conventional elements be shown in order to provide an enabling disclosure. As illustrated, the state manager 150 includes a processing unit 190, a network interface 192, a computer readable medium drive 194, an input/output device interface 196, all of which may communicate with one another by way of a communication bus. The network interface 192 may provide connectivity to one or more networks or computing systems. The processing unit 190 may thus receive information and instructions from other computing systems or services via the network 104. The processing unit 190 may also communicate to and from memory 180 and further provide output information for an optional display (not shown) via the input/output device interface 196. The input/output device interface 196 may also accept input from an optional input device (not shown).

The memory 180 may contain computer program instructions (grouped as modules in some embodiments) that the processing unit 190 executes in order to implement one or more aspects of the present disclosure. The memory 180 generally includes RAM, ROM and/or other persistent, auxiliary or non-transitory computer-readable media. The memory 180 may store an operating system 184 that provides computer program instructions for use by the processing unit 190 in the general administration and operation of the state manager 150. The memory 180 may further include computer program instructions and other information for implementing aspects of the present disclosure. For example, in one embodiment, the memory 180 includes a user interface unit 182 that generates user interfaces (and/or instructions therefor) for display upon a computing device, e.g., via a navigation and/or browsing interface such as a browser or application installed on the computing device. In addition, the memory 180 may include and/or communicate with one or more data repositories (not shown), for example, to access user program codes and/or libraries.

In addition to and/or in combination with the user interface unit 182, the memory 180 may include a shared resource management unit 186 and an instance configuration unit 188 that may be executed by the processing unit 190. In one embodiment, the user interface unit 182, shared resource management unit 186, and instance configuration unit 188 individually or collectively implement various aspects of the present disclosure, e.g., monitoring and logging the execution of program codes on the virtual compute system 110, determining the need for adjusting the amount of resources allocated to particular containers and/or requests, providing notifications to the user regarding the need to adjust the amount of resources, automatically adjusting the amount of resources, etc. as described further below.

The shared resource management unit 186 manages the different kinds of shared resources associated with particular users and/or program codes. For example, the shared resource management unit 186 may determine whether new shared resources should be created or removed. Further, the shared resource management unit 186 may synchronize data in different parts of the virtual compute system 110 to facilitate resource sharing. The shared resource management unit 186 may also perform one or more techniques described in connection with the resource manager 150.

The instance configuration unit 188 configures the instances being acquired from the warming pool 130A so that the instances can utilize the shared resources. For example, the instance configuration unit 188 may attach a file system to a particular instance or establish a peering connection to a private network owned by the user associated with the particular instance.

While the shared resource management unit 186 and the instance configuration unit 188 are shown in FIG. 2 as part of the state manager 150, in other embodiments, all or a portion of the shared resource management unit 186 and the instance configuration unit 188 may be implemented by other components of the virtual compute system 110 and/or another computing device. For example, in certain embodiments of the present disclosure, another computing device in communication with the virtual compute system 110 may include several modules or components that operate similarly to the modules and components illustrated as part of the state manager 150.

Figure 3:
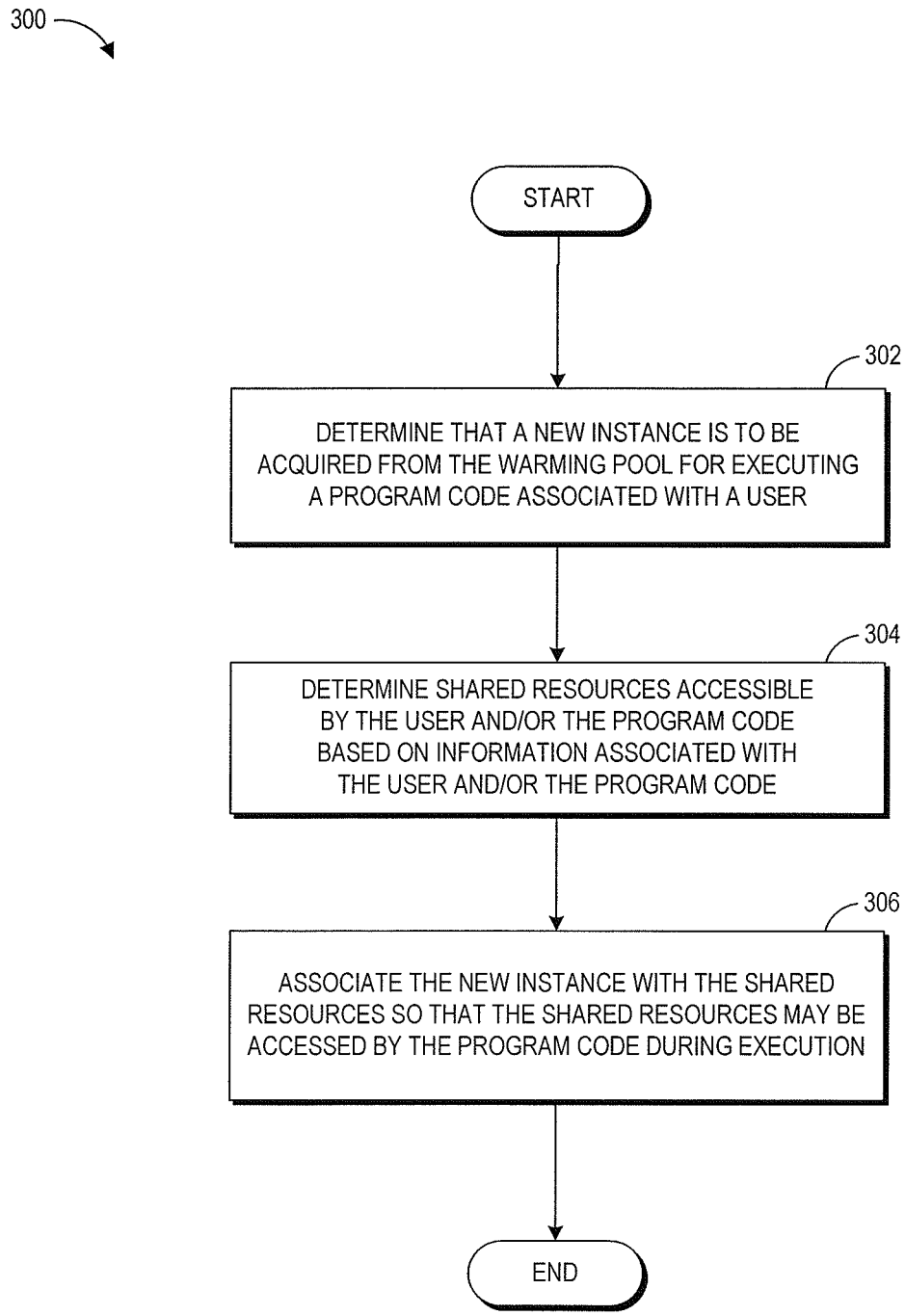
FIG. 3 is a flow diagram illustrating a state management routine implemented by a state manager, according to an example aspect.

Turning now to FIG. 3, a routine 300 implemented by one or more components of the virtual compute system 110 (e.g., the state manager 150) will be described. Although routine 300 is described with regard to implementation by the state manager 150, one skilled in the relevant art will appreciate that alternative components may implement routine 300 or that one or more of the blocks may be implemented by a different component or in a distributed manner.

At block 302 of the illustrative routine 300, the state manager 150 determines that a new instance is to be acquired from the warming pool 130A for executing a program code associated with a user. As described above, new instances may be acquired from the warming pool 130A if the capacity in the active pool 140A is insufficient to handle an incoming code execution request.

Next, at block 304, the state manager 150 determines the shared resources accessible by the user and/or the program code based on information associated with the user and/or the program code. The information associated with the user and/or the program code may be provided in the code execution request or determined based on other information included in the code execution request. For example, the state manager 150 may determine that the user associated with the request has access to a private network and has indicated in the request that he wants his program codes to be able to access the resources available in the private network. In another example, the state manager 150 may determine that the particular program code associated with the request is indicated in a shared resource database as having access to a shared disk provided on the virtual compute system 110.

At block 306, the state manager 150 associates the new instance with the shared resources so that the shared resources may be accessed by the program code during the execution of the program code. In the example above, the state manager 150 may associate the instance with the private network owned by the user by establishing a peering connection to the private network, and attach the shared disk to the instance so that the program codes running in the instance can access the private network and the shared disk.

While the routine 300 of FIG. 3 has been described above with reference to blocks 302-306, the embodiments described herein are not limited as such, and one or more blocks may be omitted, modified, or switched without departing from the spirit of the present disclosure.

Figure 4:
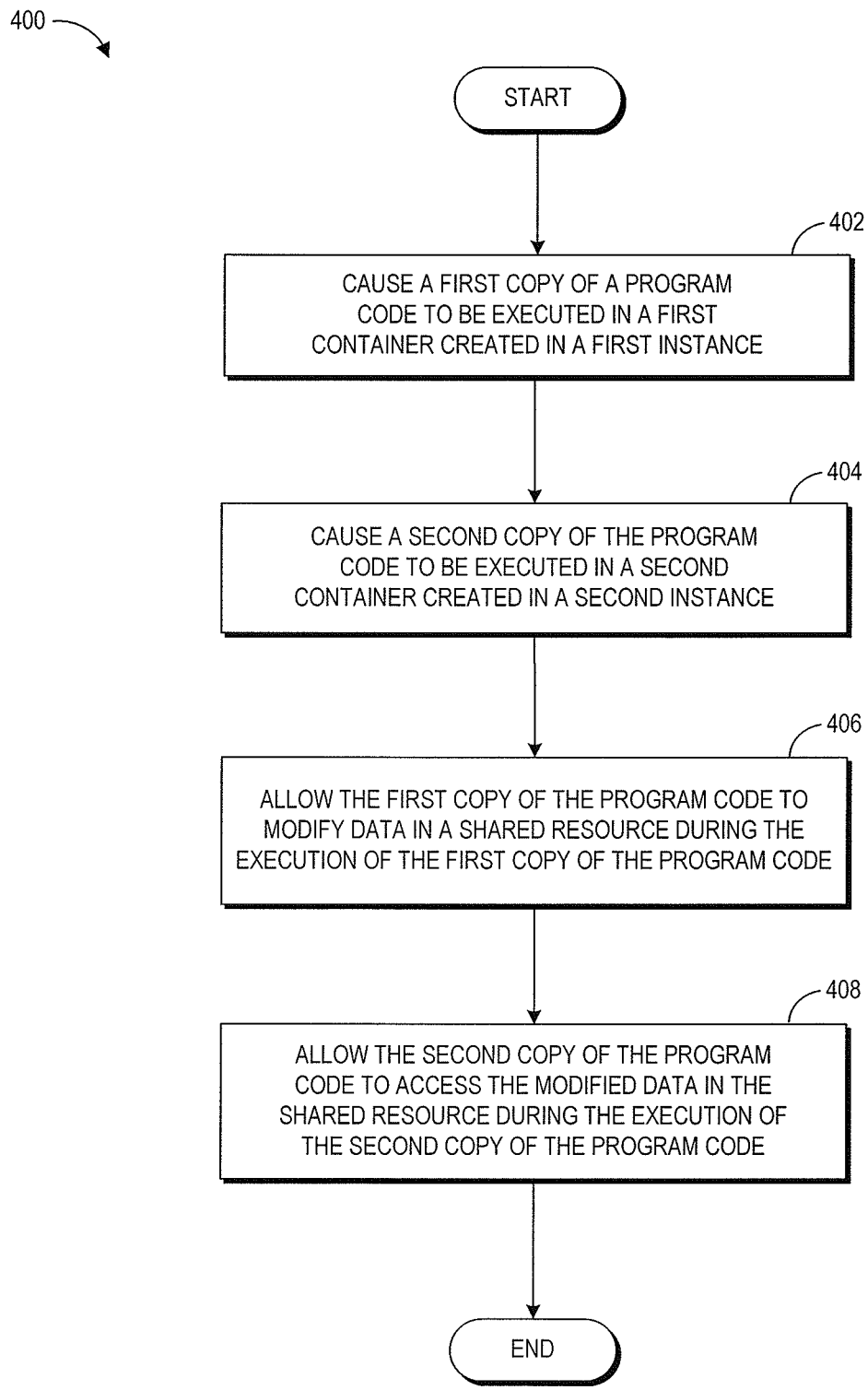
FIG. 4 is a flow diagram illustrating a state management routine implemented by a state manager, according to another example aspect.

Turning now to FIG. 4, a routine 400 implemented by one or more components of the virtual compute system 110 (e.g., the state manager 150) will be described. Although routine 400 is described with regard to implementation by the state manager 150, one skilled in the relevant art will appreciate that alternative components may implement routine 400 or that one or more of the blocks may be implemented by a different component or in a distributed manner.

At block 402 of the illustrative routine 400, the state manager 150 causes a first copy of a program code to be executed in a first container created in a first instance. For example, the first instance may be associated with a set of shared resources which may be accessed by the program codes running in the first instance. Next, at block 404, the state manager 150 causes a second copy of the program code to be executed in a second container created in a second instance. The second instance may be configured to access at least some of the set of shared resources that the first instance is configured to access. In some embodiments, the first and second instances may be the same instance.

At block 406, the state manager 150 allows the first copy of the program code to modify data in the shared resources during the execution of the first copy of the program code. For example, the first copy of the program code may invoke a call to create and set a variable that may be used by itself or other invocations of the program code.

At block 408, the state manager 150 allows the second copy of the program code to access the modified data in the shared resources during the execution of the second copy of the program code. For example, the variable created and set during the execution of the first copy of the program code may be retrieved by the execution of the second copy of the program code to perform additional computations. By allowing subsequent invocations of the program code to access data created or modified by earlier invocations of the program code, the virtual compute system 110 can allow the program code to be simplified (e.g., since redundant computations can be omitted).

While the routine 400 of FIG. 4 has been described above with reference to blocks 402-408, the embodiments described herein are not limited as such, and one or more blocks may be omitted, modified, or switched without departing from the spirit of the present disclosure.

Figure 5:
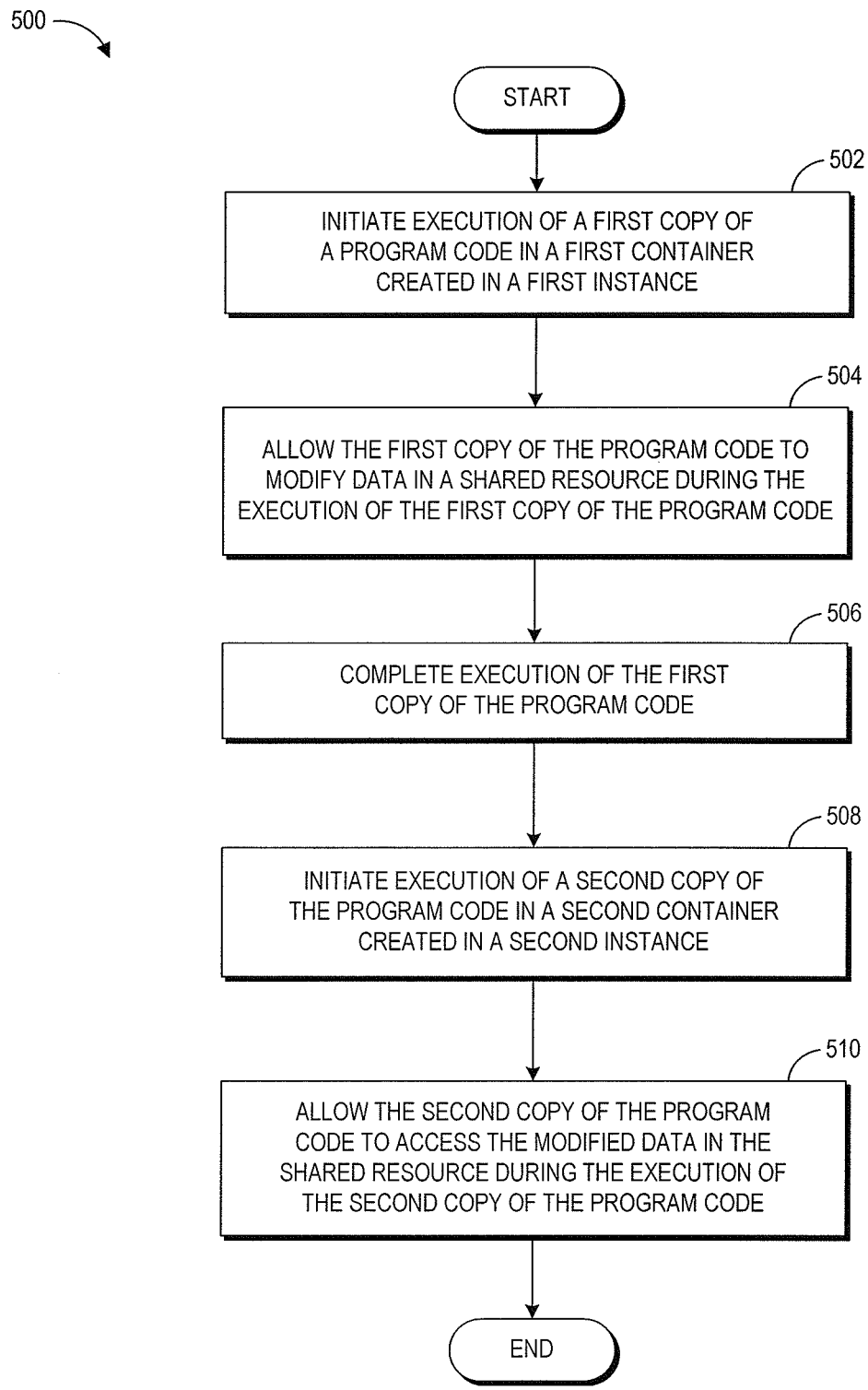
FIG. 5 is a flow diagram illustrating a state management routine implemented by a state manager, according to yet another example aspect.

Turning now to FIG. 5, a routine 500 implemented by one or more components of the virtual compute system 110 (e.g., the state manager 150) will be described. Although routine 500 is described with regard to implementation by the state manager 150, one skilled in the relevant art will appreciate that alternative components may implement routine 500 or that one or more of the blocks may be implemented by a different component or in a distributed manner.

At block 502 of the illustrative routine 500, the state manager 150 initiates the execution of a first copy of a program code in a first container created in a first instance. For example, the first instance may be associated with a set of shared resources which may be accessed by the program codes running in the first instance. Next, at block 504, the state manager 150 allows the first copy of the program code to modify data in the shared resources during the execution of the first copy of the program code. For example, the first copy of the program code may invoke a call to create, set, and/or modify a variable that may be used by itself or other invocations of the program code. At block 506, the state manager 150 completes the execution of the first copy of the program code. For example, the first copy of the program code may finish executing without any additional action by the state manager 150. In some embodiments, the state manager 150 may perform additional processing associated with the completion of the execution such as removing the first container in which the program code was executed.

At block 506, the state manager 150 initiates the execution of a second copy of the program code in a second container created in a second instance. The second instance may be configured to access at least some of the set of shared resources that the first instance is configured to access. In some embodiments, the first and second instances may be the same instance.

At block 508, the state manager 150 allows the second copy of the program code to access the modified data in the shared resources during the execution of the second copy of the program code. For example, the variable created, set, and/or modified during the execution of the first copy of the program code may be retrieved by the execution of the second copy of the program code to perform additional computations. By allowing subsequent invocations of the program code to access data created or modified by earlier invocations of the program code, the virtual compute system 110 can allow the program code to be simplified (e.g., since redundant computations can be omitted).

While the routine 500 of FIG. 5 has been described above with reference to blocks 502-510, the embodiments described herein are not limited as such, and one or more blocks may be omitted, modified, or switched without departing from the spirit of the present disclosure.

It will be appreciated by those skilled in the art and others that all of the functions described in this disclosure may be embodied in software executed by one or more physical processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storage medium storing the computer executable components such as a CD-ROM, DVD-ROM, or network interface. Further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system, comprising:
one or more hardware computing devices configured to execute specific computer-executable instructions to at least:
receive a first request to execute a first program code;
initiate, at a first time, execution of a first copy of the first program code on a first virtual machine instance, wherein the first virtual machine instance is associated with a first shared resource in a first state, and wherein the first copy of the first program code causes, during the execution of the first copy of the first program code initiated at the first time, the first state of the first shared resource to be modified;
receive a second request to execute the first program code; and
subsequent to the execution of the first copy of the first program code initiated at the first time, initiate, at a second time, execution of a second copy of the first program code, which is different from the first copy of the first program code that previously caused the first state of the first shared resource to be modified, on the first virtual machine instance, wherein the second copy of the first program code accesses, during the execution of the second copy of the first program code initiated at the second time, the first state of the first shared resource modified by the first copy of the first program code during the execution of the first copy of the first program code initiated at the first time such that access to the first shared resource modified by the first copy of the first program code is provided to at least one other copy of the same program code that is different from the first copy of the first program code.

2. The system of claim 1, wherein the one or more hardware computing devices are further configured to:
receive a third request to execute the first program code; and
initiate, at a third time, execution of a third copy of the first program code on a second virtual machine instance different from the first virtual machine instance, wherein the third copy of the first program code accesses, during the execution of the third copy of the first program code initiated at the third time, the first state of the first shared resource modified by the first copy of the first program code during the execution of the first copy of the first program code initiated at the first time.

3. The system of claim 1, wherein the one or more hardware computing devices are further configured to remove, in response to terminating the first virtual machine instance, data created or modified by the first copy of the first program code from the first shared resource.

4. The system of claim 1, wherein the first program code is no longer able to access the modified first state of the first shared resource after the first virtual machine instance is terminated.

5. The system of claim 1, wherein the execution of the first copy of the first program code initiated at the first time and the execution of the second copy of the first program code initiated at the second time occur in a first container on the first virtual machine instance, and wherein the first program code is no longer able to access the modified first state of the first shared resource after the first container is terminated.

6. The system of claim 1, wherein the one or more hardware computing devices are further configured to:
receive a third request to execute a second program code;
determine, based on account metadata associated with the second program code, a second shared resource to be made accessible during execution of the second program code;
associate a second virtual machine instance with the second shared resource such that the second shared resource is accessible during execution of the second program code; and
initiate, at a third time, execution of a first copy of the second program code on the second virtual machine instance, wherein the first copy of the second program code modifies, during the execution of the first copy of the second program code initiated at the third time, a state of the second shared resource.

7. The system of claim 6, wherein associating the second virtual machine instance with the second shared resource comprises one of attaching the second shared resource to the second virtual machine instance, establishing a connection between the second virtual machine instance and the second shared resource, or recording an association between the second virtual machine instance and the second shared resource in a database.

8. The system of claim 6, wherein an amount of time elapsed to associate the second virtual machine instance with the second shared resource is at least an order of magnitude greater than an amount of time elapsed between receiving the second request to execute the first program code and executing the second copy of the first program code initiated at the second time.

9. The system of claim 6, wherein the one or more hardware computing devices are further configured to:
receive a fourth request to execute the second program code; and
initiate, at a fourth time, execution of a second copy of the second program code on the second virtual machine instance without further associating the second virtual machine instance with the second shared resource.

10. The system of claim 6, wherein the one or more hardware computing devices are further configured to:
dissociate the second shared resource from the second virtual machine instance; and
remove data created or modified by the second program code from the second shared resource.

11. A computer-implemented method, as implemented by one or more computing devices configured with specific executable instructions, the computer-implemented method comprising:
receiving a first request to execute a first program code;
initiating, at a first time, execution of a first copy of the first program code on a first virtual machine instance, wherein the first virtual machine instance is associated with a first shared resource in a first state, and wherein the first copy of the first program code causes, during the execution of the first copy of the first program code initiated at the first time, the first state of the first shared resource to be modified;
receiving a second request to execute the first program code; and
subsequent to the execution of the first copy of the first program code initiated at the first time, initiating, at a second time, execution of a second copy of the first program code, which is different from the first copy of the first program code that previously caused the first state of the first shared resource to be modified, on the first virtual machine instance, wherein the second copy of the first program code accesses, during the execution of the second copy of the first program code initiated at the second time, the first state of the first shared resource modified by the first copy of the first program code during the execution of the first copy of the first program code initiated at the first time such that access to the first shared resource modified by the first copy of the first program code is provided to at least one other copy of the same program code that is different from the first copy of the first program code.

12. The computer-implemented method of claim 11, further comprising:
receiving a third request to execute a second program code;
determining, based on account metadata associated with the second program code, a second shared resource to be made accessible during execution of the second program code;
associating a second virtual machine instance with the second shared resource such that the second shared resource is accessible during execution of the second program code; and
initiating, at a third time, execution of a first copy of the second program code on the second virtual machine instance, wherein the first copy of the second program code modifies, during the execution of the first copy of the second program code initiated at the third time, a state of the second shared resource.

13. The computer-implemented method of claim 12, wherein associating the second virtual machine instance with the second shared resource comprises one of attaching the second shared resource to the second virtual machine instance, establishing a connection between the second virtual machine instance and the second shared resource, or recording an association between the second virtual machine instance and the second shared resource in a database.

14. The computer-implemented method of claim 12, further comprising:
receiving a fourth request to execute the second program code; and
initiating, at a fourth time, execution of a second copy of the second program code on the second virtual machine instance without further associating the second virtual machine instance with the second shared resource.

15. The computer-implemented method of claim 12, further comprising:
dissociating the second shared resource from the second virtual machine instance; and
removing data created or modified by the second program code from the second shared resource.

16. Non-transitory physical computer storage storing computer executable instructions that, when executed by one or more computing devices, configure the one or more computing devices to:
receive a first request to execute a first program code;
initiate, at a first time, execution of a first copy of the first program code on a first virtual machine instance, wherein the first virtual machine instance is associated with a first shared resource in a first state, and wherein the first copy of the first program code causes, during the execution of the first copy of the first program code initiated at the first time, the first state of the first shared resource to be modified;

receive a second request to execute the first program code; and subsequent to the execution of the first copy of the first program code initiated at the first time, initiate, at a second time, execution of a second copy of the first program code, which is different from the first copy of the first program code that previously caused the first state of the first shared resource to be modified, on the first virtual machine instance, wherein the second copy of the first program code accesses, during the execution of the second copy of the first program code initiated at the second time, the first state of the first shared resource modified by the first copy of the first program code during the execution of the first copy of the first program code initiated at the first time such that access to the first shared resource modified by the first copy of the first program code is provided to at least one other copy of the same program code that is different from the first copy of the first program code.

17. The non-transitory physical computer storage of claim 16, wherein the computer executable instructions further configure the one or more computing devices to:

receive a third request to execute a second program code;

determine, based on account metadata associated with the second program code, a second shared resource to be made accessible during execution of the second program code;

associate a second virtual machine instance with the second shared resource such that the second shared resource is accessible during execution of the second program code; and initiate, at a third time, execution of a first copy of the second program code on the second virtual machine instance, wherein the first copy of the second program code modifies, during the execution of the first copy of the second program code initiated at the third time, a state of the second shared resource.

18. The non-transitory physical computer storage of claim 17, wherein associating the second virtual machine instance with the second shared resource comprises one of attaching the second shared resource to the second virtual machine instance, establishing a connection between the second virtual machine instance and the second shared resource, or recording an association between the second virtual machine instance and the second shared resource in a database.

19. The non-transitory physical computer storage of claim 17, wherein the computer executable instructions further configure the one or more computing devices to:

receive a fourth request to execute the second program code; and initiate, at a fourth time, execution of a second copy of the second program code on the second virtual machine instance without further associating the second virtual machine instance with the second shared resource.

20. The non-transitory physical computer storage of claim 17, wherein the computer executable instructions further configure the one or more computing devices to:

dissociate the second shared resource from the second virtual machine instance; and remove data created or modified by the second program code from the second shared resource.

* * * * *